(12) United States Patent
Nishikawa

(10) Patent No.: US 7,328,292 B2
(45) Date of Patent: Feb. 5, 2008

(54) ARBITRATION METHOD AND DEVICE

(75) Inventor: Tomoki Nishikawa, Wakayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/522,404

(22) Filed: Sep. 18, 2006

(65) Prior Publication Data

US 2007/0011389 A1    Jan. 11, 2007

Related U.S. Application Data

(63) Continuation of application No. PCT/JP2005/05017, filed on Mar. 18, 2005.

(30) Foreign Application Priority Data

Mar. 18, 2004  (JP) ............................. 2004-078125

(51) Int. Cl.
*H04N 11/00* (2006.01)
*G06F 15/16* (2006.01)
*G06F 15/00* (2006.01)
*G06F 13/36* (2006.01)
*H04N 5/91* (2006.01)

(52) U.S. Cl. ..................... 710/113; 710/240; 710/241; 710/242; 710/243; 709/235

(58) Field of Classification Search ........ 710/240–243, 710/113–125
See application file for complete search history.

(56) References Cited

U.S. PATENT DOCUMENTS

| | | | | |
|---|---|---|---|---|
| 5,483,289 A | * | 1/1996 | Urade et al. ................ | 348/468 |
| 5,546,543 A | * | 8/1996 | Yang et al. .................. | 709/235 |
| 5,752,266 A | | 5/1998 | Mayawaki et al. | |
| 5,841,472 A | * | 11/1998 | Rim et al. ............. | 375/240.25 |
| 5,862,355 A | * | 1/1999 | Logsdon ...................... | 710/116 |
| 5,901,296 A | | 5/1999 | Lackman et al. | |
| 5,904,732 A | * | 5/1999 | Greenley et al. ............. | 710/57 |
| 5,959,672 A | | 9/1999 | Sasaki | |

(Continued)

FOREIGN PATENT DOCUMENTS

JP          3-53362 A       3/1991

(Continued)

OTHER PUBLICATIONS

"Prioritized Arbitration for Input-Queued Switches with 100% Throughput"—retrieved from http://ieeexplore.ieee.org/iel5/6371/17046/00786865.pdf?arnumber=786865—retreived on Sep. 20, 2007—6 pages.*

(Continued)

*Primary Examiner*—Paul R. Myers
*Assistant Examiner*—Brian Misiura
(74) *Attorney, Agent, or Firm*—McDermott Will & Emery LLP

(57) ABSTRACT

In an arbitration device, the entire transfer efficiency is improved without increasing the operating frequency and the number of pins. An overflow monitor mechanism generates an alarm once detecting a danger of occurrence of an overflow in an internal buffer group. An arbiter dynamically changes the priority order of arbitration once receiving the alarm from the overflow monitor mechanism and gives priority to processing of a request from a buffer having a danger of occurrence of an overflow.

7 Claims, 30 Drawing Sheets

U.S. PATENT DOCUMENTS

| | | | |
|---|---|---|---|
| 6,148,381 A * | 11/2000 | Jotwani | 711/158 |
| 6,512,884 B1 * | 1/2003 | Sawada | 386/96 |
| 6,538,656 B1 * | 3/2003 | Cheung et al. | 345/519 |
| 6,557,052 B1 * | 4/2003 | Kubo | 710/23 |
| 6,584,152 B2 * | 6/2003 | Sporer et al. | 375/240.01 |
| 6,604,156 B1 * | 8/2003 | Slivkoff et al. | 710/57 |
| 6,678,332 B1 * | 1/2004 | Gardere et al. | 375/240.26 |
| 6,751,405 B1 * | 6/2004 | Hasegawa | 386/111 |
| 6,791,990 B1 * | 9/2004 | Collins et al. | 370/412 |
| 6,804,738 B2 * | 10/2004 | Weber | 710/244 |
| 6,806,872 B2 * | 10/2004 | Mino et al. | 345/211 |
| 6,892,390 B1 * | 5/2005 | Lieberman et al. | 725/135 |
| 6,925,120 B2 * | 8/2005 | Zhang et al. | 375/240.08 |
| 6,988,153 B2 * | 1/2006 | Furuya | 710/57 |
| 7,006,575 B2 * | 2/2006 | Yamaguchi et al. | 375/240.26 |
| 7,054,989 B2 * | 5/2006 | Mizobata | 710/316 |
| 7,110,041 B2 * | 9/2006 | Matsumoto | 348/468 |
| 7,120,714 B2 * | 10/2006 | O'Connor et al. | 710/243 |
| 7,143,219 B1 * | 11/2006 | Chaudhari et al. | 710/111 |
| 7,167,269 B2 * | 1/2007 | Wu et al. | 358/1.18 |
| 7,209,992 B2 * | 4/2007 | MacInnis et al. | 710/244 |
| 2001/0038644 A1 * | 11/2001 | Yamauchi et al. | 370/487 |
| 2003/0145139 A1 * | 7/2003 | Kubo | 710/23 |
| 2004/0215807 A1 * | 10/2004 | Pinder et al. | 709/232 |

FOREIGN PATENT DOCUMENTS

| | | |
|---|---|---|
| JP | 8-314793 A | 11/1996 |
| JP | 9-98428 A | 4/1997 |
| JP | 10-177546 A | 6/1998 |
| JP | 2000-347987 A | 12/2000 |
| JP | 2001-291318 A | 10/2001 |
| JP | 2002-196975 A | 7/2002 |
| WO | WO 00/03541 | 1/2000 |

OTHER PUBLICATIONS

Hideki Yamauchi, et al., "TECHI digital hoso no kisogijutu nyumon (introduction to basic technology of digital broadcasting)," Chapter 7, BS digital hi-vision yo LSI no shosai (Details of LSI for BS digital high-definition TV, Jan. 1, 2002, p. 104-105, CG Publishing.

* cited by examiner

US 7,328,292 B2

ARBITRATION METHOD AND DEVICE

CROSS REFERENCE TO RELATED APPLICATIONS

This is a continuation of Application PCT/JP2005/005017 filed on Mar. 18, 2005. This Non-provisional application claims priority under 35 U.S.C. §119(a) on Patent Applications No. 2004-078125 filed in Japan on Mar. 18, 2004, the entire contents of which are hereby incorporated by reference.

TECHNICAL FIELD

The present invention relates to an arbitration method and device, and more particularly, relates to transfer between a reception apparatus including a transport decoder and an AV decoder and an external memory.

BACKGROUND ART

Conventionally, in a DTV system LSI, reception data received via an antenna is sent to a transport decoder, in which the data is divided into various types of data (hereinafter, also called AV data) such as an audio signal (audio data), a video signal (video data) and a character signal (teletext data), and then transferred to an external memory for temporary storage. The temporarily stored data is transferred from the external memory to an AV decoder in response to a request from the AV decoder, to start AV decoding. Transfer factors between the system LSI and the external memory include write from the LSI into the external memory and read of various types of data temporarily stored by the write from the external memory to the LSI.

In the conventional system, for example, an external memory interface is provided with an arbitration device for arbitrating transfer requests from cores, and a similar arbitration device is also provided inside each core. These arbitration devices repeat predetermined operation set in advance as hardware to thereby perform data transfer to/from the external memory.

In the conventional technology described above, the transfer timing at which data required by the AV decoder is transferred from the transport decoder varies randomly depending on a data string in an input stream and the processing by the AV decoder.

Also, memory transfer in the system is performed following an arbitration order determined in advance. Therefore, there may exist a time period in which priority is not given to transfer of data to which the highest priority should be given at given timing, if any, but is given to transfer of different data. In this event, in which transfer of data to which the highest priority should be given is blocked, a memory bandwidth locally large compared with that necessary when the system is in an averaged state will be necessary for some time period, and thus the effective bandwidth will reach its peak.

For example, in the conventional DTV system, if transfer is jammed with requests output from cores, temporarily blocking transfer between the transport decoder and the external memory, input data may not be transferred from a buffer inside the transport decoder to the external memory for some time period.

During such a time period, however, the transport decoder continues receiving reception data via the antenna. When the transfer state to/from the external memory is recovered after continuation of the above situation for a given time period, transfer factors other than the sending of the reception data must have accumulated, and thus requests may not be easily accepted. Accordingly, a video signal may fail to be sent to the AV decoder and this causes irregularities in images.

When reception data is received continuously at high speed but is not transferred to the external memory, the inner buffer overflows resulting in loss of reception data. This causes loss of continuity of data required for AV decoding and thus raises a serious problem in the system.

To solve the problem described above, it may be conceived to increase the circuit scale and the number of pins in an attempt to increase the data amount transferable at one time between the transport decoder and the external memory, or to increase the operating frequency in an attempt to ensure high-speed transfer to/from the external memory. To realize this, however, measures such as changing the circuit configuration and replacing the interface with high-speed one are necessary, and this causes another problem of cost increase.

Moreover, in recent years, memory unification has been frequently adopted in which one unified external memory is shared in each block, and the interface with the external memory has been unified in many cases. In such a unified memory, one external memory is accessed in real time transfer of which predetermined rate must be always guaranteed and in non-real time transfer of which average rate only is guaranteed, and therefore, it has become difficult to make estimation for guarantee of transfer of locally required data. Further, insufficient estimation may cause an unexpected event such as transfer failure. For providing a safety net, design with a large margin which offers surplus transfer performance is necessitated for taking in consideration, as the safety net, the worst case of each transfer. However, this increases the cost. In view of this, an increase in transfer efficiency as a whole and relief from surplus performance design are expected by not transferring unnecessary one out of real time transfer always requiring a guarantee at a given rate.

In the conventional system, in which the bandwidth of the system is not managed, it is not possible to obtain in actual operation information on the state of the system in the normal operation and information on the extent to which the maximum value actually reaches when the required bandwidth locally increases. Therefore, when a problem occurs in actual operation, there is only few means of analysis for clarifying under which circumstances the problem has occurred, and this makes it difficult to re-create the state in which the problem has occurred. For this reason, it takes time to track down the cause and finds difficulty in clarifying the cause.

SUMMARY OF THE INVENTION

In view of the above problems, an object of the present invention is providing an arbitration device and method capable of improving the entire transfer efficiency without increasing the operating frequency and the number of pins.

In order to solve the problems described above, the present invention is directed to an arbitration method for arbitrating transfer requests for a plurality of items of transfer data. The method includes dynamically changing the priority order of arbitration set in advance for the plurality of items of transfer data based on information indicating a danger of occurrence of an overflow with the transfer data.

According to the invention described above, when there is a danger of occurrence of an overflow with transfer data, the priority order of arbitration is dynamically changed. This can prevent loss of data due to an overflow without especially increasing the circuit scale and the number of pins or without especially increasing the speed of transfer to/from an external memory.

According to another aspect, the present invention is directed to an arbitration device for arbitrating transfer requests for a plurality of items of transfer data, including: a plurality of buffers for temporarily storing the plurality of items of transfer data respectively; a monitor mechanism for monitoring the status of transfer of the plurality of items of transfer data to the plurality of buffers; and an arbiter for dynamically changing the priority order of arbitration for the plurality of items of transfer data based on an input bit rate of the transfer data to each of the buffers and a remaining capacity of the buffer monitored by the monitor mechanism.

According to the invention described above, the status of transfer of the transfer data to the buffers is monitored by the monitor mechanism, and the priority order of arbitration for the plurality of items of transfer data is dynamically changed based on the input bit rate of the transfer data to each of the buffers and the remaining capacity of the buffer. This can prevent loss of data due to an overflow without especially increasing the circuit scale and the number of pins or without especially increasing the speed of transfer to/from an external memory.

Preferably, the arbitration device described above includes: means for generating a log from the input bit rate and the remaining capacity of the buffer; and means for determining sending timing of the generated log.

With the above configuration, a log on the system state can be acquired at fixed intervals.

According to the present invention, in the interface between an LSI and an external memory, the effective bandwidth can be increased without increasing the operating frequency and the transfer amount transferable at one time, and thus efficient transfer between the system LSI and the external memory is permitted. This enables improvement in quality with reduced fabrication cost. Also, high quality robust against an unstable state can be provided.

Also, since information on which types of transfer have been made to/from an external memory within a predetermined time is acquired as a log, analysis can be made in case of breakdown of the system due to an unexpected event.

BEST MODE FOR CARRYING OUT THE INVENTION

Hereinafter, embodiments of the present invention will be described with reference to relevant drawings. Note that the following description of preferred embodiments is essentially merely illustrative and by no means intended to restrict the present invention, applications thereof and uses thereof.

Embodiment 1

Figure 1:
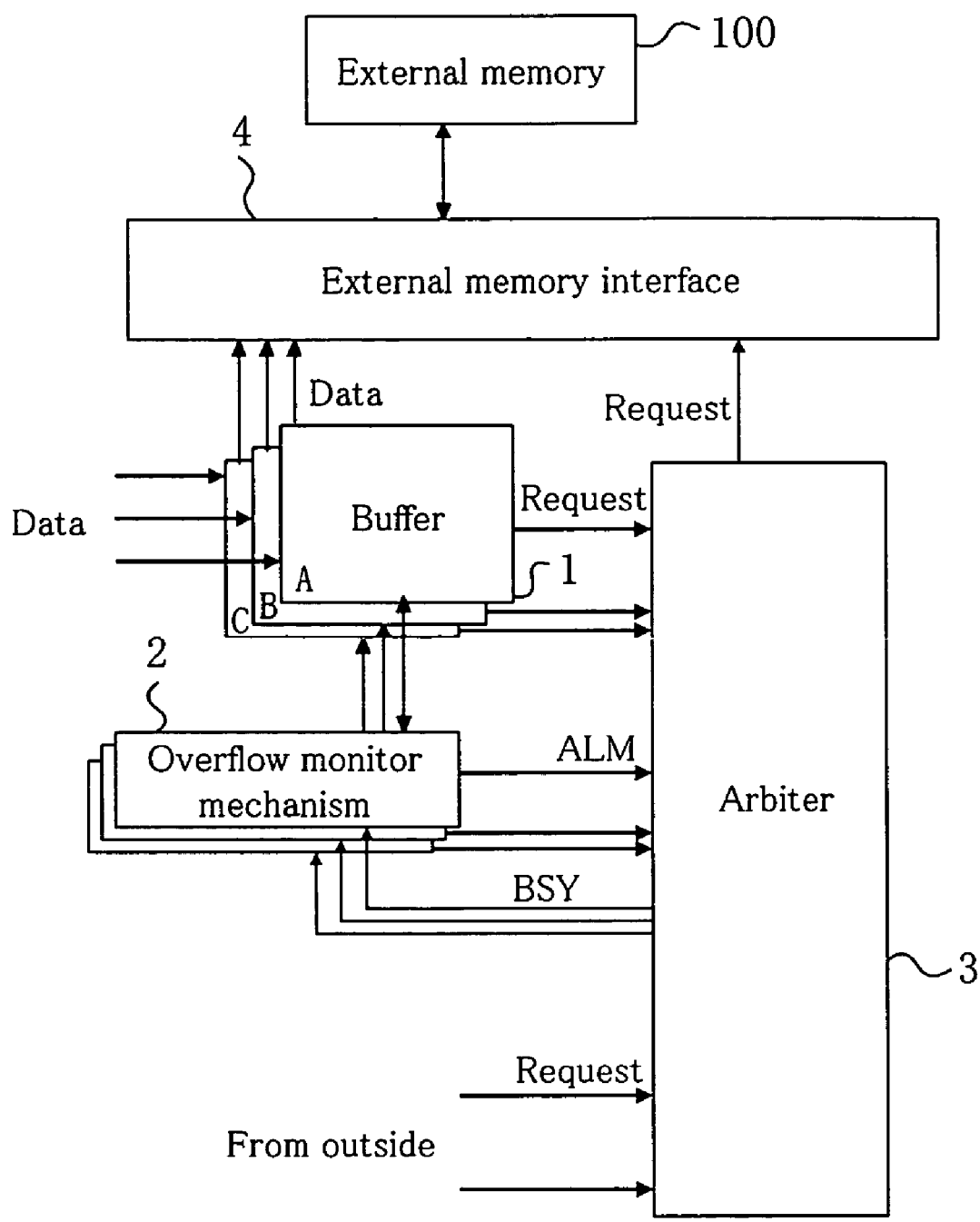
FIG. 1 is a block diagram of an arbitration device of Embodiment 1 of the present invention.

FIG. 1 shows a configuration of an arbitration device of Embodiment 1 of the present invention. In FIG. 1, the reference numeral 1 denotes an internal buffer group for temporarily storing data to be sent to an external memory 100, 2 denotes an overflow monitor mechanism for monitoring an overflow of each of buffers A, B and C of the internal buffer group 1, 3 denotes an arbiter for arbitrating transfer requests for a plurality of transfer factors, and 4 denotes an external memory interface for arbitrating data transfer to the external memory 100.

The internal buffer group 1 issues a request to the arbiter 3 for external memory access after input data stored in any of the buffers A, B and C has reached a predetermined amount.

The overflow monitor mechanism 2, monitoring the state of each buffer of the internal buffer group 1, sends a signal ALM warning of a danger of occurrence of an overflow to the arbiter 3 when a request from the internal buffer group 1 has been left unaccepted for a predetermined time due to jamming of transfer requests. This makes it possible to prevent occurrence of such an event that a request from the internal buffer group 1 is long left unaccepted and after the lapse of a predetermined time the buffer having the unanswered request overflows.

The arbiter 3 receives requests issued from a plurality of transfer factors including the internal buffer group 1, and in response to the requests, issues a request for memory access to the external memory interface 4 to start the memory access. When receiving the signal ALM from the overflow monitor mechanism 2, the arbiter 3 changes the priority order of arbitration.

Figure 2:
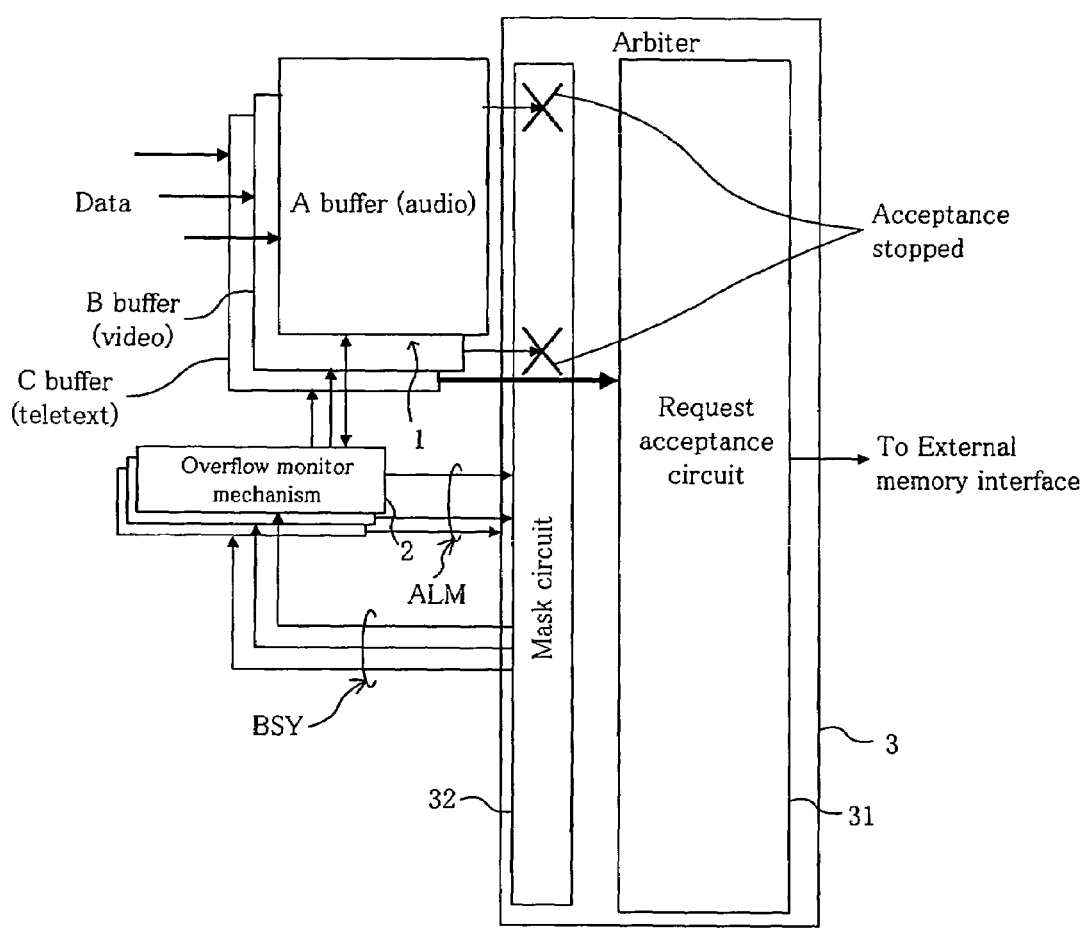
FIG. 2 is a view showing an example in which the priority order of arbitration has been changed.

FIG. 2 shows a state of the arbitration device of this embodiment in which the priority order of arbitration has been changed. In FIG. 2, the arrows pointing from the buffers to the arbiter 3 indicate requests issued from the buffers as transfer factors. Assume that there are an audio signal (hereinafter, called audio), a video signal (hereinafter, called video) and a character signal (hereinafter, called teletext) as write transfer factors to the external memory 100. The buffers of the internal buffer group 1 and the respective overflow monitor mechanisms 2 shown in FIG. 1 are provided in correspondence with these three write transfer factors to the external memory 100.

The state shown in FIG. 2 indicates that among the write transfer factors to the external memory 100, the signal ALM for the buffer C for teletext is output to a request acceptance circuit 31 and acceptance of the requests from the buffers for audio and video has been stopped by a mask circuit 32. Also, when receiving a plurality of signals ALM from the overflow monitor mechanisms 2, the mask circuit 32 outputs a signal BSY to the relevant overflow monitor mechanism 2 in an attempt to stop data write into the relevant buffer.

For example, when the remaining capacity of any of the buffers of the internal buffer group 1 is 18 bytes and the input bit rate is 72 Mbps, the buffer of the remaining capacity of 18 bytes will become full in 2 μsec. If the buffer must wait for data transfer after it has become its full state, the buffer will overflow causing breakdown.

Figure 3:
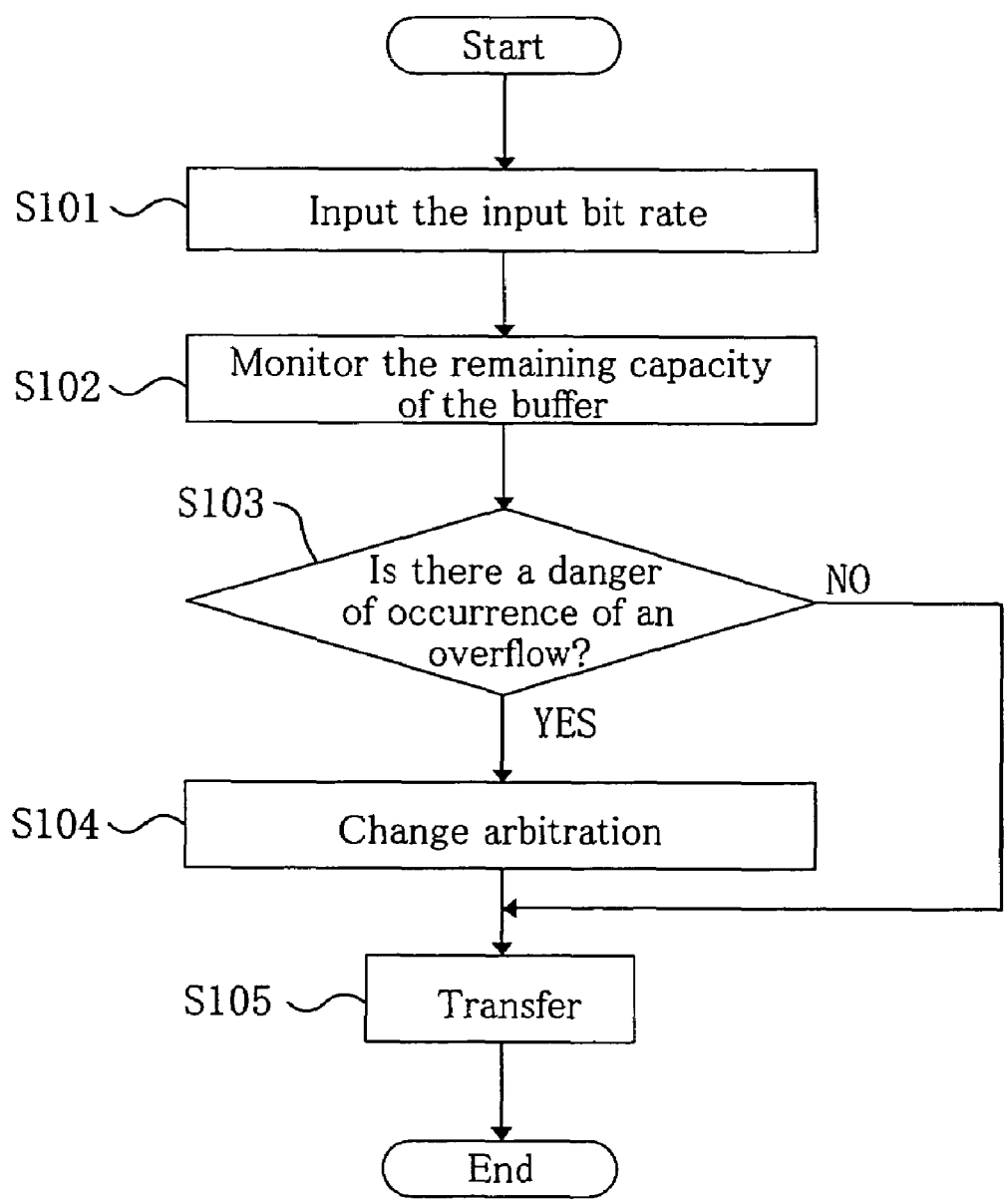
FIG. 3 is a flowchart of an arbitration method of Embodiment 1 of the present invention.

A flow for avoiding such an overflow is shown in FIG. 3. In step S101, the input bit rate of data input into a buffer is sent to the overflow monitor mechanism 2. In step S102, the remaining capacity of the buffer is monitored by the overflow monitor mechanism 2. In step S103, whether or not there is a danger of occurrence of an overflow of the buffer is determined based on the remaining capacity of the buffer and the input bit rate. If it is determined that there is a danger in the step S103, the priority order of arbitration in the arbiter 3 is dynamically changed in step S104, and data transfer is started in step S105. If it is determined that there is no danger in the step S103, no change is made in the priority order of arbitration, and data transfer is started in the step S105. Upon completion of the data transfer, the processing described above is repeated from the step S101 or S102.

Figure 4:
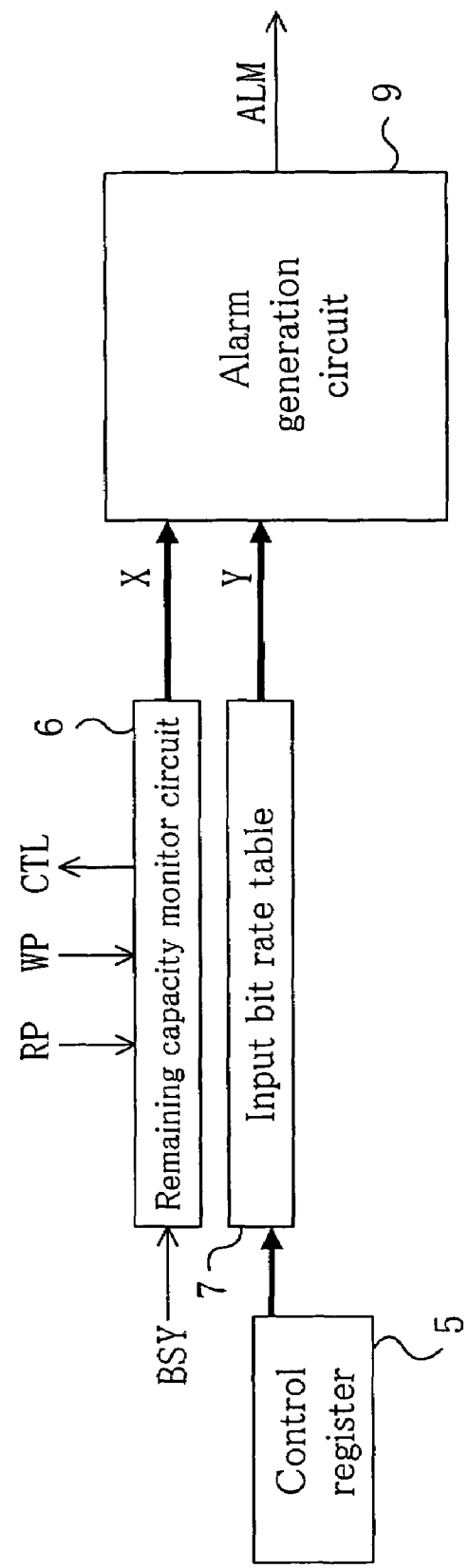
FIG. 4 is a block diagram of an overflow monitor mechanism in Embodiment 1 of the present invention.

How to determine whether or not there is a danger of occurrence of an overflow of a buffer will be described with reference to FIG. 4. FIG. 4 shows a configuration of the overflow monitor mechanism 2, in which the reference numeral 5 denotes a control register placed outside the overflow monitor mechanism 2, 6 denotes a remaining capacity monitor circuit for monitoring the remaining capacity of a buffer, 7 denotes an input bit rate table for storing the input bit rate generated based on the value in the control register 5, and 9 denotes an alarm generation circuit for generating the signal ALM based on output information from the remaining capacity monitor circuit 6 and the input bit rate table 7.

Specifically, the remaining capacity monitor circuit 6 computes the remaining capacity by referring to a read point RP and a write point WP of the buffer to be monitored. Also, as shown in FIGS. 1 and 2, when the signal BSY is output from the arbiter 3, the remaining capacity monitor circuit 6 outputs a control signal CTL for prohibiting write of new data into the buffer to be monitored. Conventionally, with no instruction of write prohibition, the buffer tends to overflow. Therefore, forceful resetting is necessary for restoration. In this embodiment, in which data write into the buffer is stopped before occurrence of an overflow, the buffer is prevented from overflowing, and thus no forceful reset operation is required.

The alarm generation circuit 9 generates the signal ALM warning of a danger of occurrence of an overflow in the internal buffer group 1 based on the computation result of expression (1)

$$X - \sigma \geq Y \times \zeta \quad (1)$$

wherein X[byte] is the remaining capacity of a buffer output from the remaining capacity monitor circuit 6, Y[byte/μsec] is the input bit rate output from the input bit rate table 7, and ζ and σ are arbitrary fixed values given in advance as the time and margin for generating the signal ALM.

As described above, the overflow monitor mechanism 2 monitors the remaining capacity of a buffer and generates the signal ALM in consideration of the input bit rate of data input into the buffer.

Thus, in the arbitration device of Embodiment 1, the priority order of data transfer, that is, the priority order of arbitration by the arbiter can be dynamically changed in response to an alarm from the overflow monitor mechanism, to thereby enable data transfer without occurrence of breakdown of a buffer Although an example of using an external memory was described in Embodiment 1, the arbitration device of the present invention is not limited to use of an external memory but can also use an internal memory. This also applies to embodiments to follow.

Embodiment 2

Figure 5:
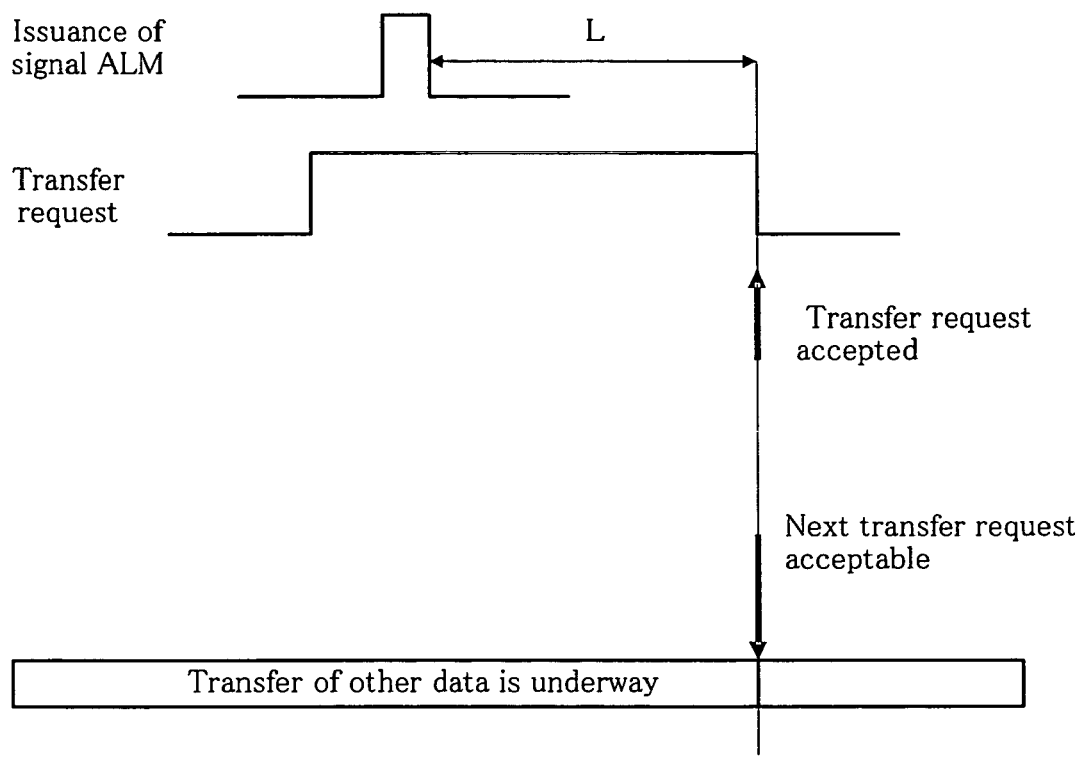
FIG. 5 is a view demonstrating delay in data transfer.

In Embodiment 1, the priority order of arbitration can be dynamically changed in response to the signal ALM output from the overflow monitor mechanism 2. However, it is not possible to guarantee all of transfer for the transfer factors. For example, when an alarm is generated for given data by the overflow monitor mechanism 2, transfer of other data may be underway as shown in FIG. 5. In this case, a latency L as the sum of the circuit delay and a delay caused by the transfer of the other data exists before next transfer is accepted. During this delay time, the relevant buffer may possibly overflow. In view of this, Embodiment 2 is configured so that given data be output from a buffer before the buffer overflows even when transfer of other data is underway. The configuration of the arbitration device of Embodiment 2 and the flow of processing thereby are basically the same as those in Embodiment 1. Therefore, the same components as those in Embodiment 1 are denoted by the same reference numerals, and only different points will be described hereinafter. This also applies to Embodiments 3 to 13 to follow.

Figure 6:
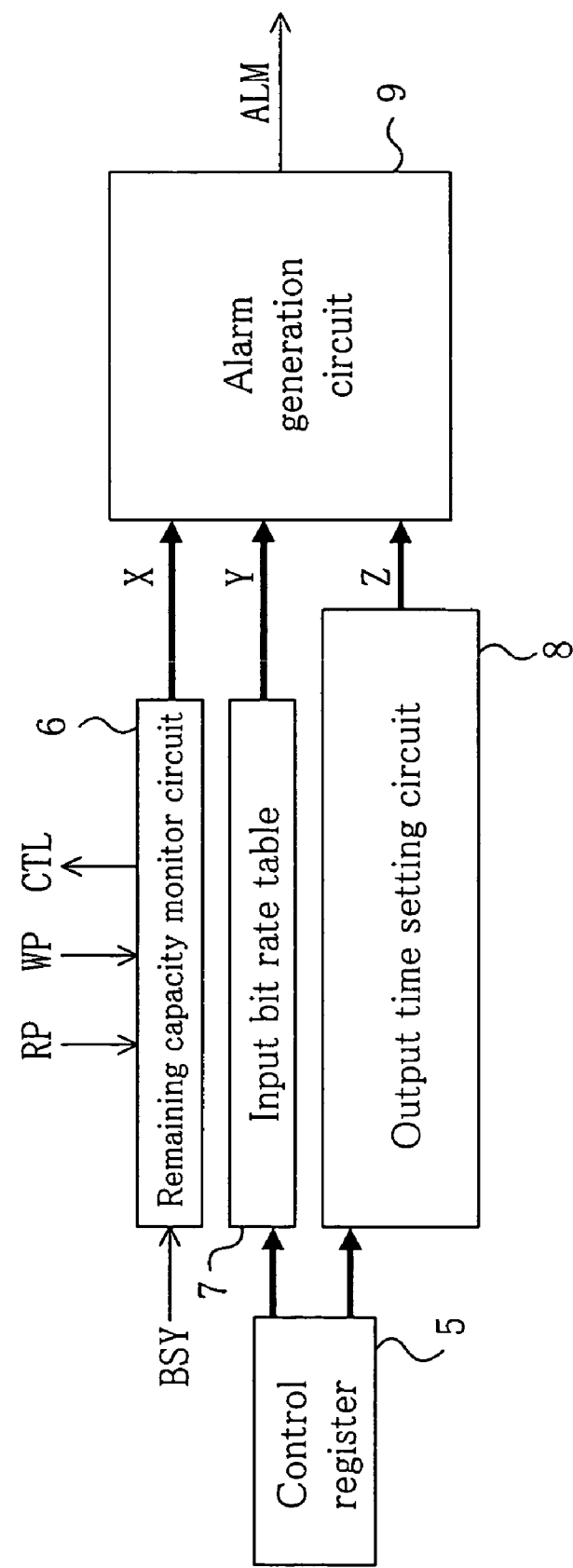
FIG. 6 is a block diagram of an overflow monitor mechanism in Embodiment 2 of the present invention.

As shown in FIG. 6, the overflow monitor mechanism 2 in Embodiment 2 includes an output time setting circuit 8 in addition to the components of the overflow monitor mechanism 2 in Embodiment 1.

The output time setting circuit 8 computes the maximum processing time required from issuance of the signal ALM until data accumulated in the relevant buffer is transferred to enable input of data into the buffer again, based on a value set in the control register 5. The maximum processing time as used herein refers to the sum of the delay time from issuance of the signal ALM until acceptance of the signal, the time from termination of transfer of some data that is underway at arrival of the signal ALM at the arbiter 3, if such data transfer exists, until acceptance of data transfer related to the signal ALM, and the time required until the data in the relevant buffer has been transferred to enable input of data into the buffer.

The alarm generation circuit 9 generates the pre-overflow signal ALM based on output information from the remaining capacity monitor circuit 6, the input bit rate table 7 and the output time setting circuit 8. The alarm generation circuit 9 generates the signal ALM warning of a danger of occurrence of an overflow in the internal buffer group 1 based on the computation result of expression (2)

$$X - \delta \geq Y \times Z \qquad (2)$$

wherein X[byte] is the remaining capacity of a buffer output from the remaining capacity monitor circuit 6, Y[byte/μsec] is the input bit rate output from the input bit rate table 7, Z[μsec] is the maximum processing time, and δ is an arbitrary fixed value given in advance as a margin of the time for generating the signal ALM.

Figure 7:
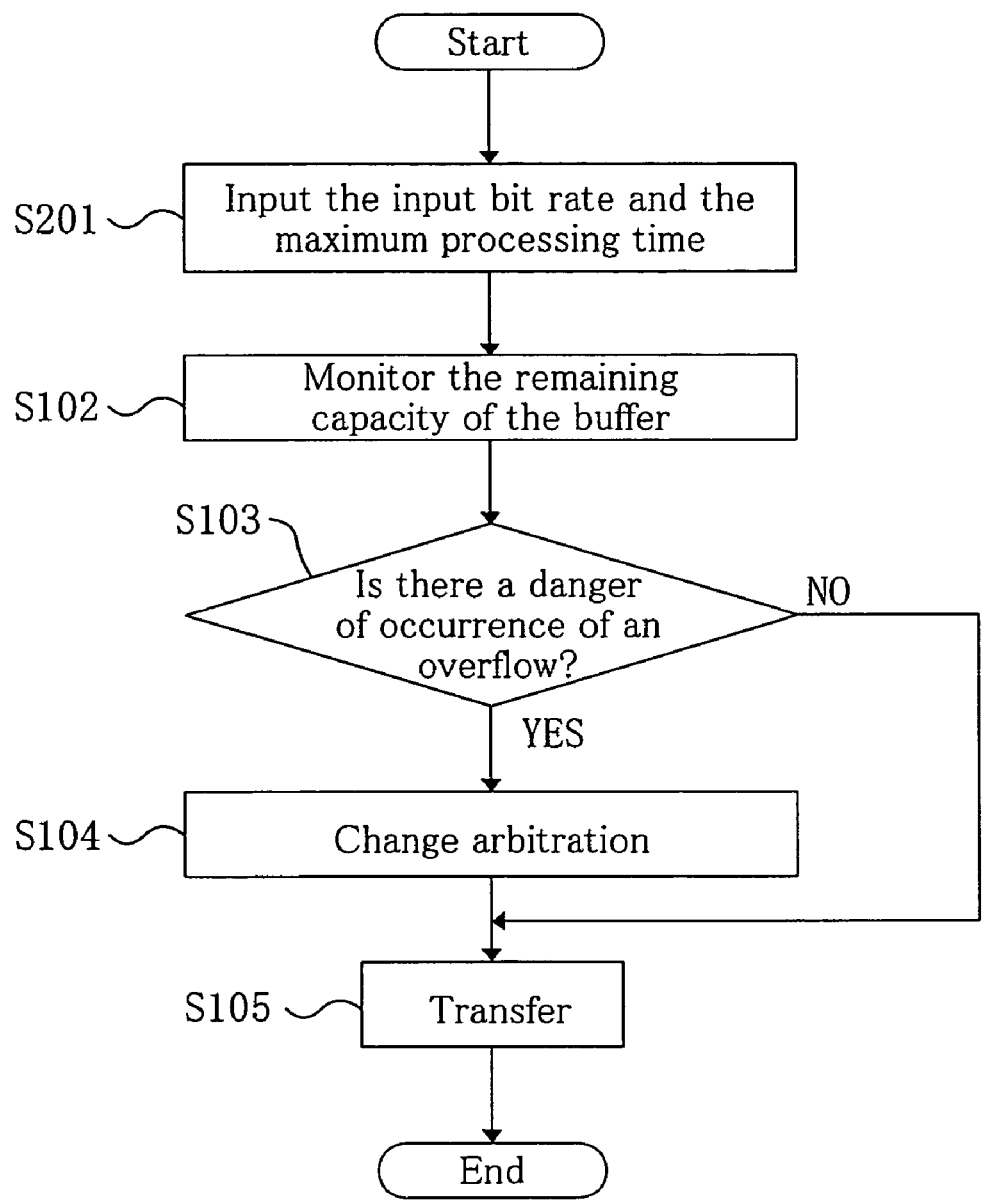
FIG. 7 is a flowchart of an arbitration method of Embodiment 2 of the present invention.

FIG. 7 shows a flow for outputting data from a buffer before the buffer overflows even when data transfer is underway. First, in step S201, the input bit rate of data input into the buffer, and the time required from output of data stored in the buffer until input of data into the buffer is allowed next, that is, the maximum processing time, are input into the overflow monitor mechanism 2. In the step S102, the remaining capacity of the buffer is monitored by the overflow monitor mechanism 2. In the step S103, whether or not there is a danger of occurrence of an overflow of the buffer is determined based on the remaining capacity of the buffer, the input bit rate and the maximum processing time. If it is determined that there is a danger in the step S103, the priority order of arbitration in the arbiter 3 is dynamically changed in the step S104, and data transfer is started in the step S105. If it is determined that there is no danger in the step S103, no change is made in the priority order of arbitration by the arbiter 3 and data transfer is started in the step S105. Upon completion of the data transfer, the processing described above is repeated from the step S201 or S102. Thus, the signal ALM is issued by the alarm generation circuit 9 to the arbiter 3 before an overflow occurs, and the arbiter 3 dynamically changes its arbitration in response to the signal ALM, and in this way, an overflow of the buffer can be prevented.

For example, assume that the time computed by the output time setting circuit 8 is 2 μsec and the input bit rate is 72 Mbps. The information of 2 μsec and the information of 72 Mbps given to the input bit rate table 7 via the external register setting are sent to the alarm generation circuit 9, while the remaining capacity monitor circuit 6 continues sending information on the remaining capacity of the buffer to the alarm generation circuit 9. The alarm generation circuit 9 issues the signal ALM to the arbiter 3 immediately before the capacity computed by the remaining capacity monitor circuit 6 reaches 18 bytes corresponding to 2 μsec, whereby the arbiter 3 changes the priority order of arbitration.

Figure 8:
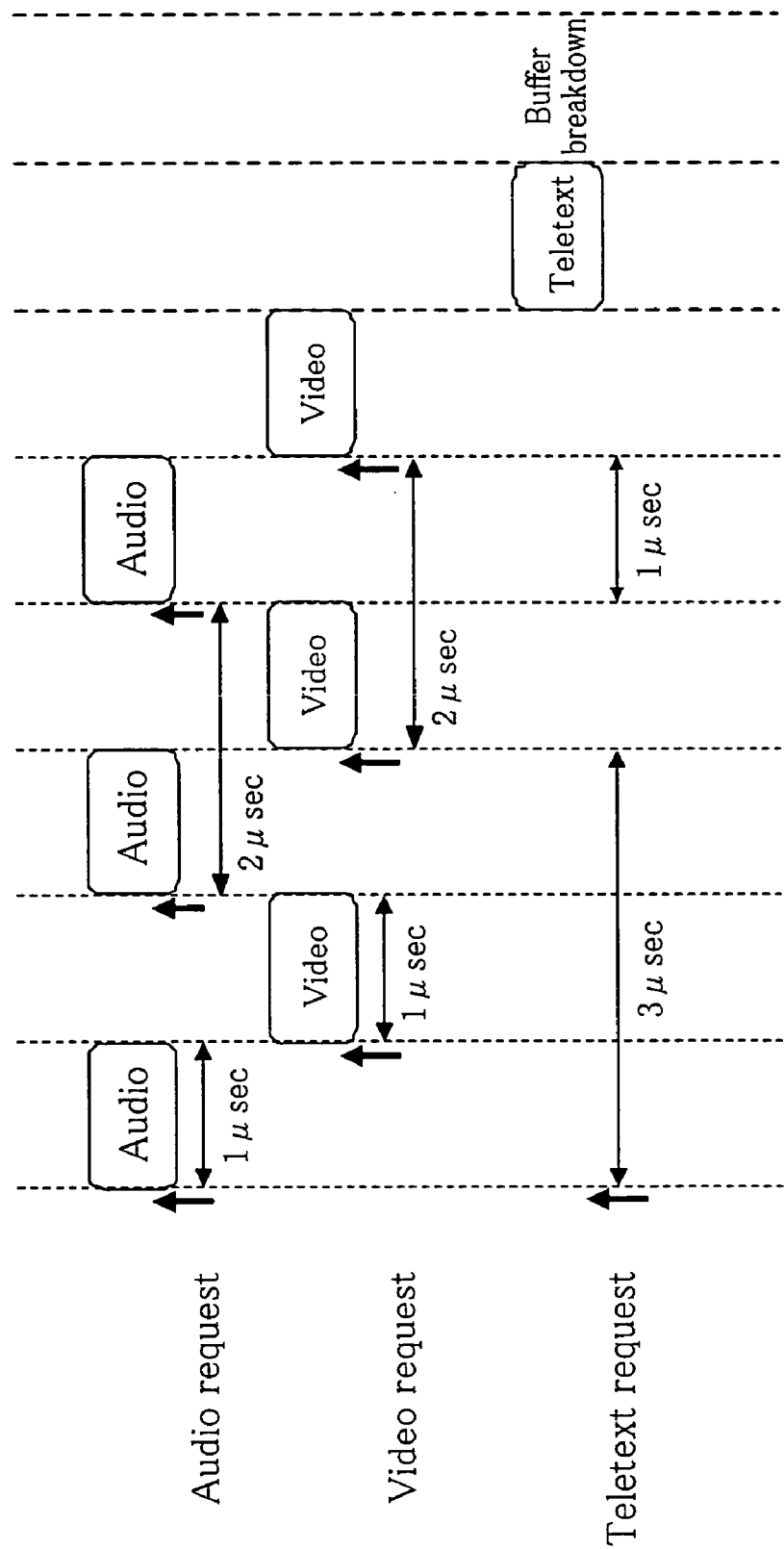
FIG. 8 is a view showing an example of buffer breakdown.

An example in which a buffer becomes full and breaks down in a conventional arbitration device having no such mechanism as the overflow monitor mechanism 2 is shown in FIG. 8. In the example of FIG. 8, the priority order of arbitration is fixed. Assume that priority is given in the order of audio, video and teletext. Assume also that the buffer for teletext will break down if data transfer is not completed within 3 μsec that is the time period from output of a transfer request until output of the next request, and that after output of a transfer request for teletext data, the next request for teletext data will not be output immediately. Likewise, assume that the buffer for audio and the buffer for video will break down if data transfer is not completed within 2 μsec, and that transfer of audio and video data is performed at fixed intervals and the interval is 1 μsec.

Figure 9:
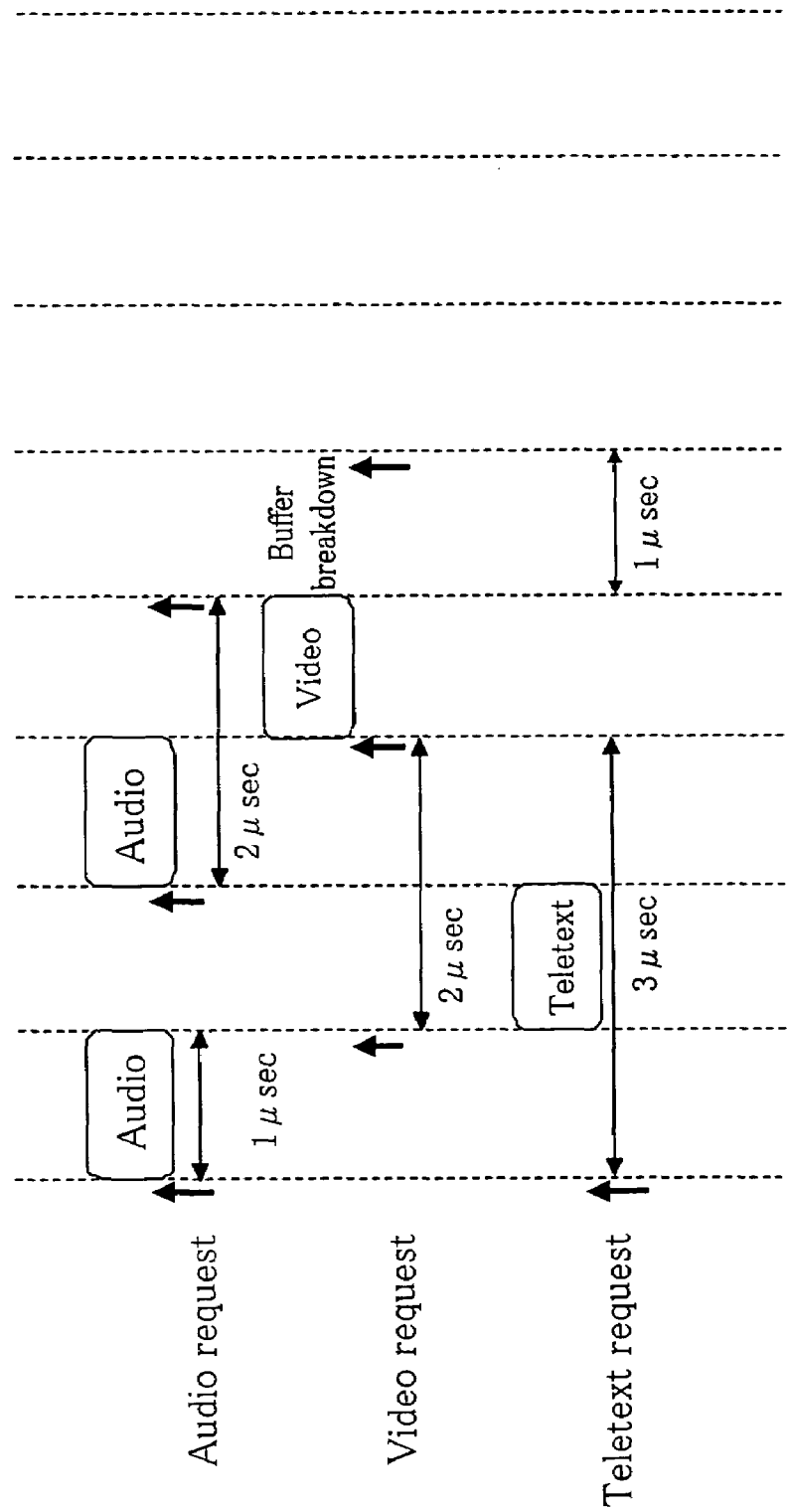
FIG. 9 is a view showing an example of buffer breakdown.

In the example shown in FIG. 8, transfer of teletext data is kept blocked by transfer of audio and video data. Therefore, the buffer for teletext breaks down failing to complete transfer within 3 μsec after output of a request. If the priority of arbitration is given in the order of teletext, audio and video, transfer of video data will then be blocked by transfer of teletext and audio data, resulting in breakdown of the buffer for video, as shown in FIG. 9.

Figure 10:
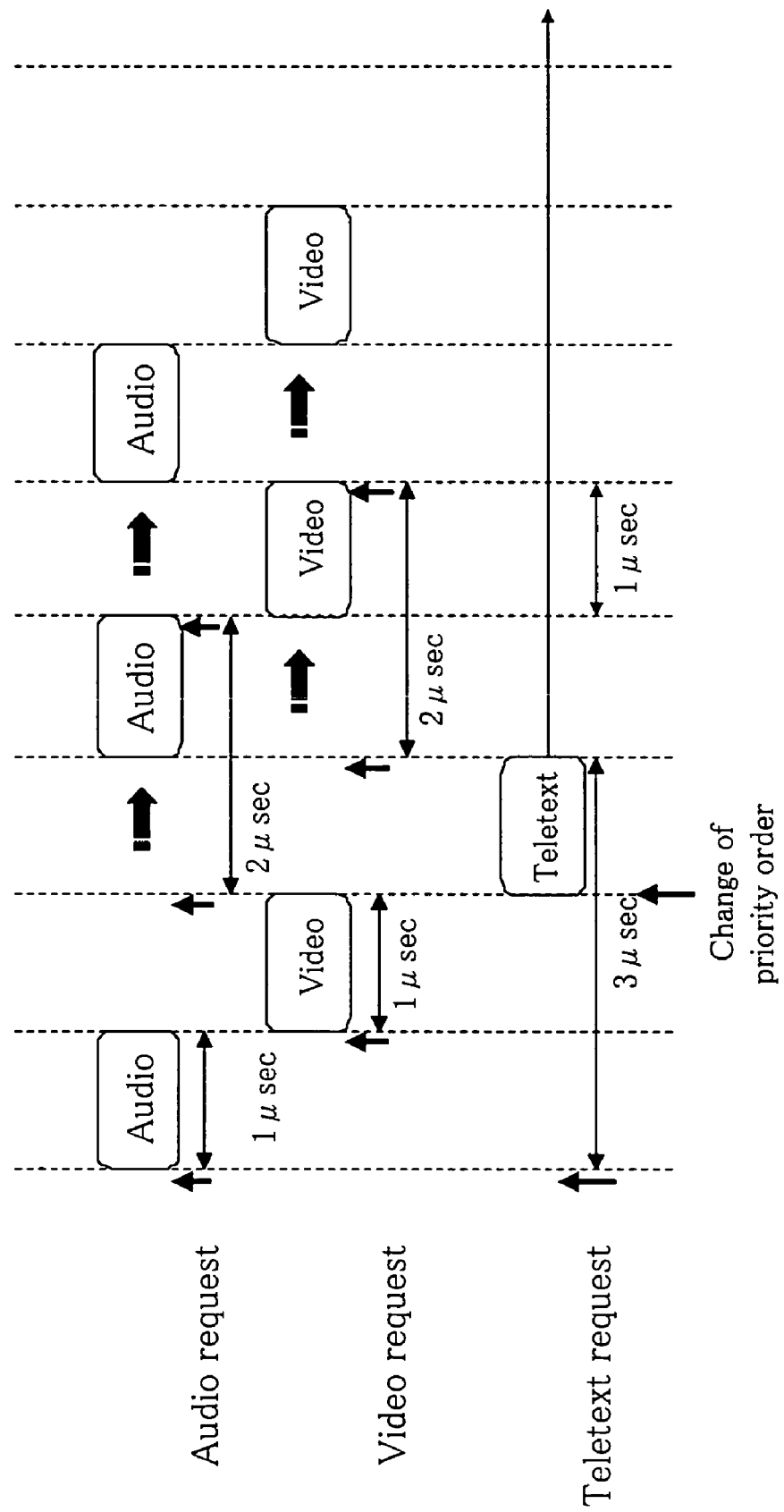
FIG. 10 is a view showing an example of avoidance of buffer breakdown.

In the arbitration device of Embodiment 2, teletext data is transferred, and yet transfer of audio and video data is guaranteed, as shown in FIG. 10. In this way, in a system having performance equivalent to that of the conventional system, no breakdown of a buffer will occur by dynamically changing the priority order of data transfer.

Thus, in the arbitration device having the overflow monitor mechanism 2, by dynamically changing the priority order of arbitration by use of the signal ALM, an overflow of a buffer can be prevented without changing the capacity of the buffer or increasing the operating frequency. This enables efficient data transfer and improves the effective bandwidth of the entire system, resulting in reduction in power consumption. Also, since available space in the bandwidth can be allocated to other transfer factors, CPU performance can be improved in a CPU-incorporated system.

Embodiment 3

Figure 11:
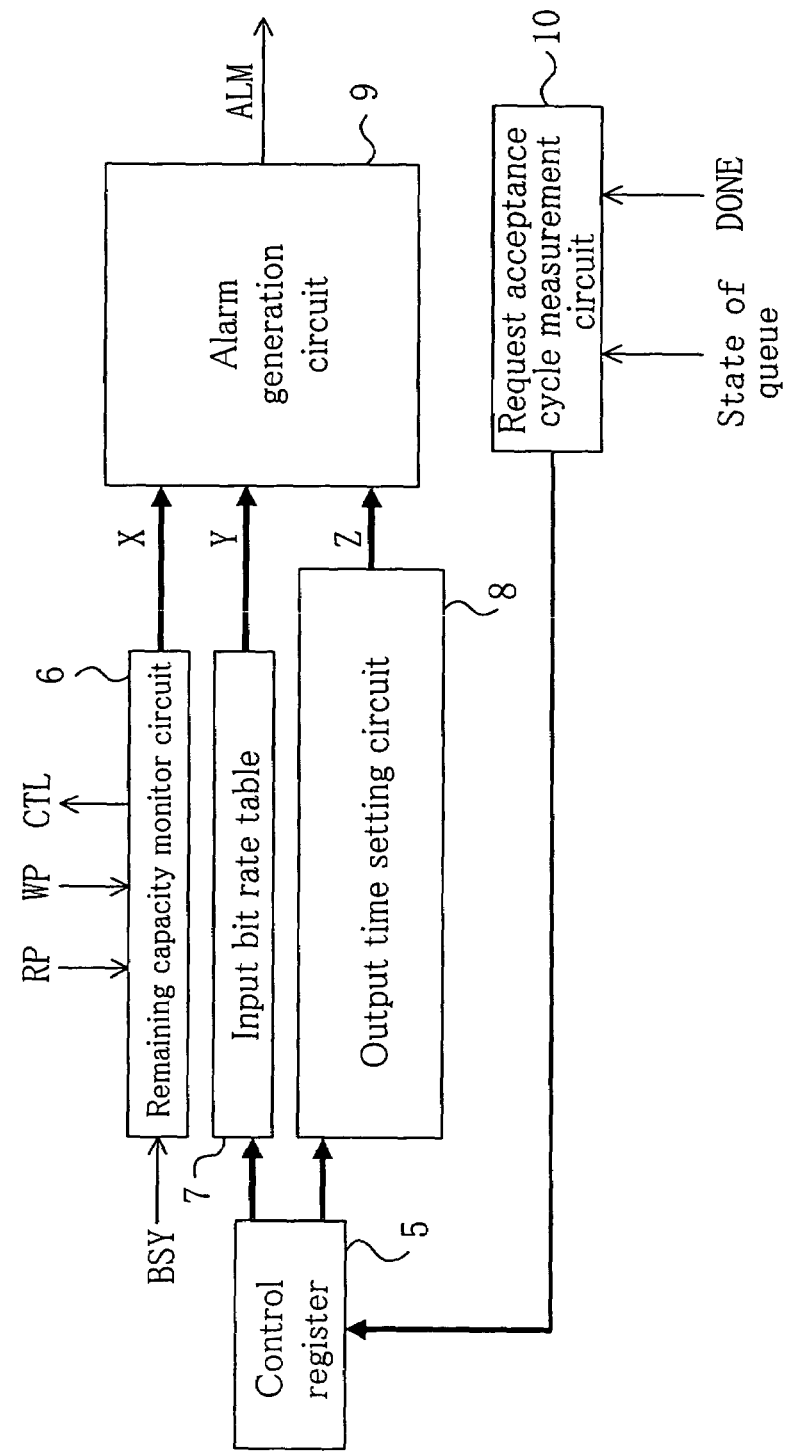
FIG. 11 is a block diagram of an overflow monitor mechanism in Embodiment 3 of the present invention.

FIG. 11 shows a configuration of the overflow monitor mechanism 2 in one embodiment. As shown in FIG. 11, the overflow monitor mechanism 2 in Embodiment 3 includes a request acceptance cycle measurement circuit 10 for measuring the request acceptance cycle sent from the arbiter 3 in addition to the components of the overflow monitor mechanism 2 in Embodiment 2. The minimum acceptance time measured by the request acceptance cycle measurement circuit 10 is automatically input into the control register 5.

For example, as shown in FIG. 5, the latency L, as the sum of the delay time required until arrival of data at the external memory and a delay time for waiting if transfer of other data is underway, exists from issuance of the signal ALM until data transfer becomes available. Also, if the external memory is under operation of data transfer in response to another request at the time of arrival of the signal ALM, next data transfer will not be accepted until termination of the data transfer.

In view of the above, the request acceptance cycle measurement circuit 10 detects the request acceptance time indicating how many cycles are taken from issuance of the signal ALM until data transfer becomes available, and writes the resultant information in the control register 5. Specifically, the request acceptance cycle measurement circuit 10 predicts the latency L as the request acceptance time from a signal DONE indicating that the external memory interface 4 has accepted a request from any of cores and the state of the queue, that is, the free space status of the queue in the external memory interface 4. Based on the value set in the control register 5, the output time setting circuit 8 computes the maximum processing time Z required from issuance of the signal ALM until data accumulated in the relevant buffer is transferred to enable input of data into the buffer again.

As described above, in Embodiment 3, the signal ALM warning of occurrence of an overflow of a buffer is output in keeping with actual transfer by use of the request acceptance cycle measurement circuit 10. Therefore, increase in transfer efficiency is expected in addition to the effects obtained in Embodiments 1 and 2.

Embodiment 4

Figure 12:
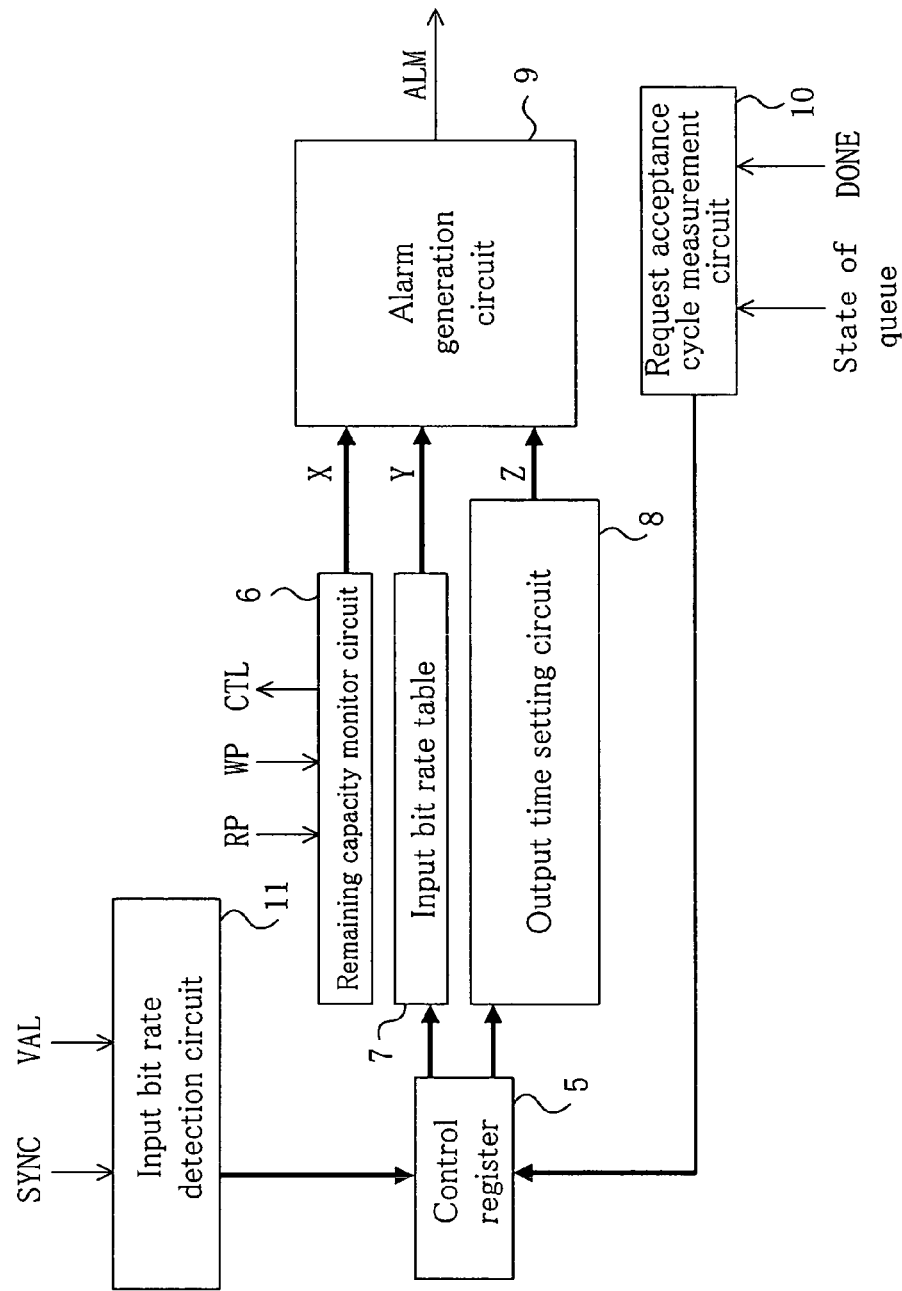
FIG. 12 is a block diagram of an overflow monitor mechanism in Embodiment 4 of the present invention.

FIG. 12 shows a configuration of the overflow monitor mechanism 2 in one embodiment. As shown in FIG. 12, the overflow monitor mechanism 2 in Embodiment 4 includes an input bit rate detection circuit 11 for detecting the input bit rate of data input into the internal buffer group 1 in addition to the components of the overflow monitor mechanism 2 in Embodiment 3. The input bit rate value detected by the input bit rate detection circuit 11 is automatically input into the control register 5.

Figure 13:
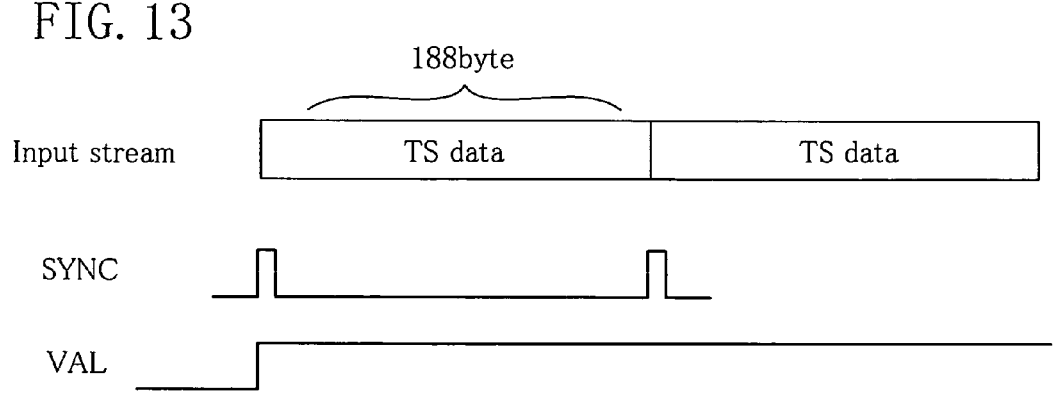
FIG. 13 is a view illustrating an input signal in a digital TV system.

For example, an input stream of reception data in a digital TV system, adopting transport stream (TS) style, includes a packet sync signal (SYNC) indicating the head of each data string and a packet valid signal (VAL) indicating that the data is valid, as shown in FIG. 13. The input bit rate detection circuit 11 measures the interval between pulses of the packet sync signal SYNC and subtracts a time period during which the packet valid signal VAL is invalid.

Valid data of a fixed number of bytes (for example, 188 bytes as shown in FIG. 13) for one packet headed by a pulse of the packet sync signal SYNC is sent as TS data. Therefore, the input bit rate detection circuit 11 holds this information therein in the form of a table, and calculates the input bit rate from values in the table and the cycle of the packet sync signal SYNC.

As described above, in Embodiment 4, in which the input bit rate is automatically detected, measures can be taken against irregularities in input bit rate due to disturbance and the like, in addition to obtaining the effects described in Embodiments 1 to 3.

Embodiment 5

Figure 14:
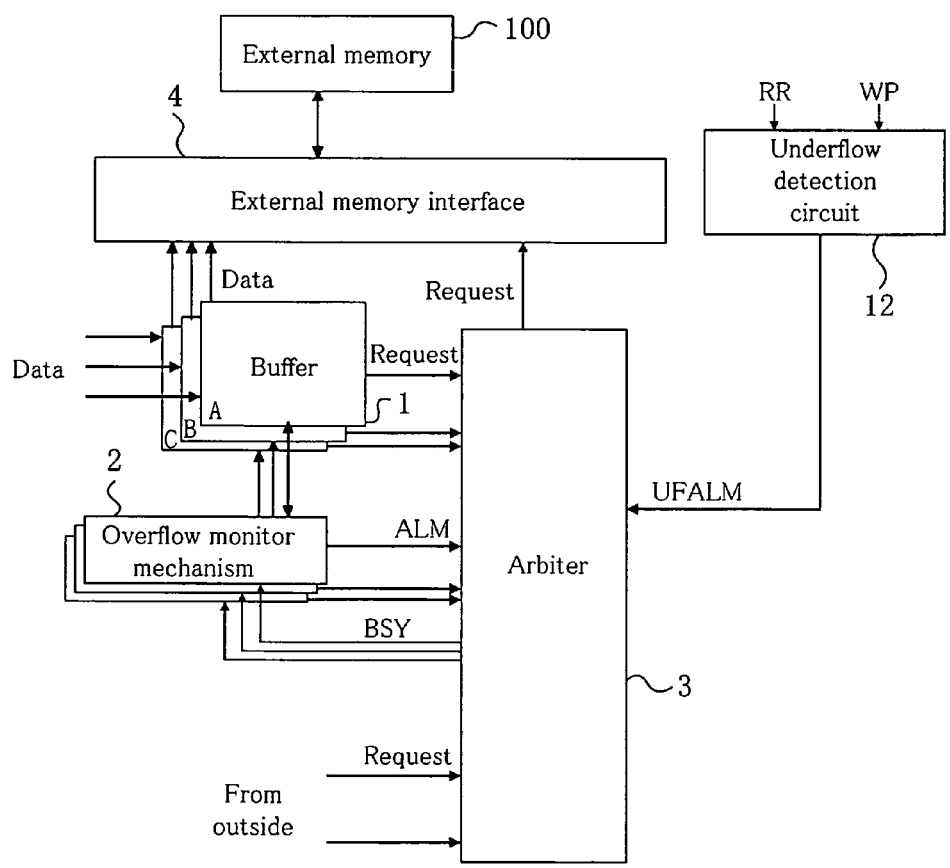
FIG. 14 is a block diagram of an arbitration device of Embodiment 5 of the present invention.

FIG. 14 shows a configuration of an arbitration device of Embodiment 5 of the present invention. In FIG. 14, the reference numeral 12 denotes an underflow detection circuit. The underflow detection circuit 12 detects a danger of occurrence of an underflow of a buffer in an AV decoder by referring to a read point RP and a write point WP of the buffer, for example.

Figure 15:
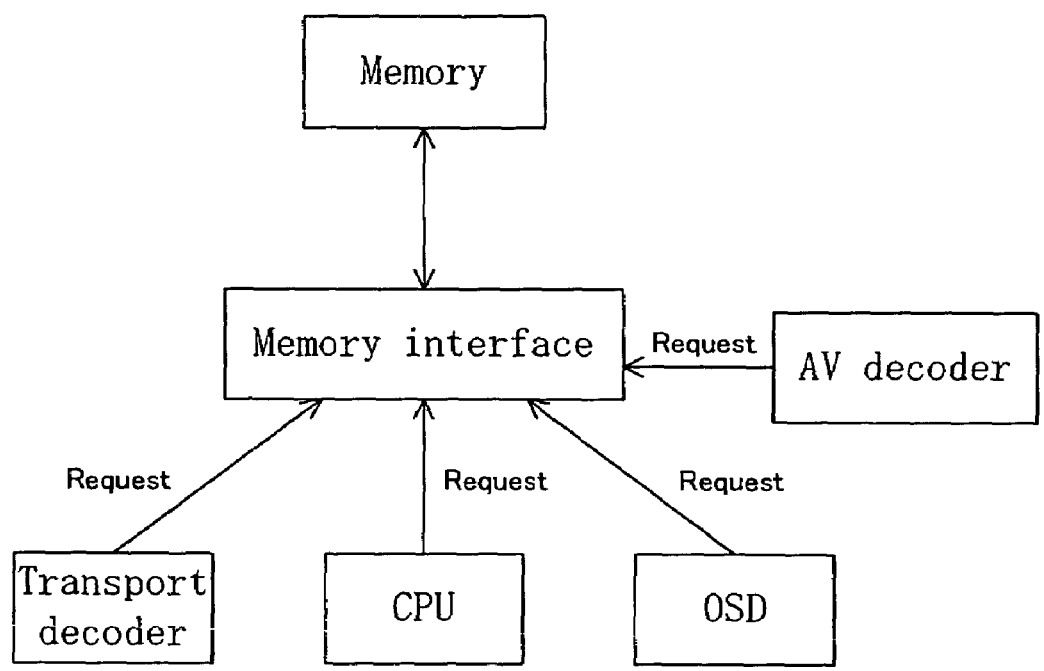
FIG. 15 is a block diagram of a digital TV system adopting unified memory architecture.

For example, consider a flow of data in a 1-chip digital TV system adopting unified memory architecture in which cores such as a CPU, a transport decoder and an AV decoder provided in the system access one common external or internal memory, as shown in FIG. 15. In the arbitration device of Embodiment 1, in which write of input data into the external memory is protected, an overflow with reception data can be avoided. However, sufficient measures are not necessarily taken against an underflow of a buffer in the AV decoder that reads data stored in the external memory for decoding.

For example, in the digital TV system, the AV decoder connected to the transport decoder receives AV data from the transport decoder to thereby output images. If the reception of data delays resulting in absence of data in the AV decoder, a trouble will arise in video or audio decoding.

In view of the above, the underflow detection circuit 12 is provided near the AV decoder or the transport decoder as shown in FIG. 14, to issue a signal UFALM indicating a danger of occurrence of an underflow when the AV decoder is short of a fixed amount of data required for AV decoding. The arbiter 3 receiving the signal UFALM can perform control of giving higher priority of arbitration to data, such as an audio signal, a video signal and a character signal, read from a temporary-storing memory such as the external memory 100 to be sent to the AV decoder. In this way, occurrence of irregularities in images can be prevented.

Figure 16:
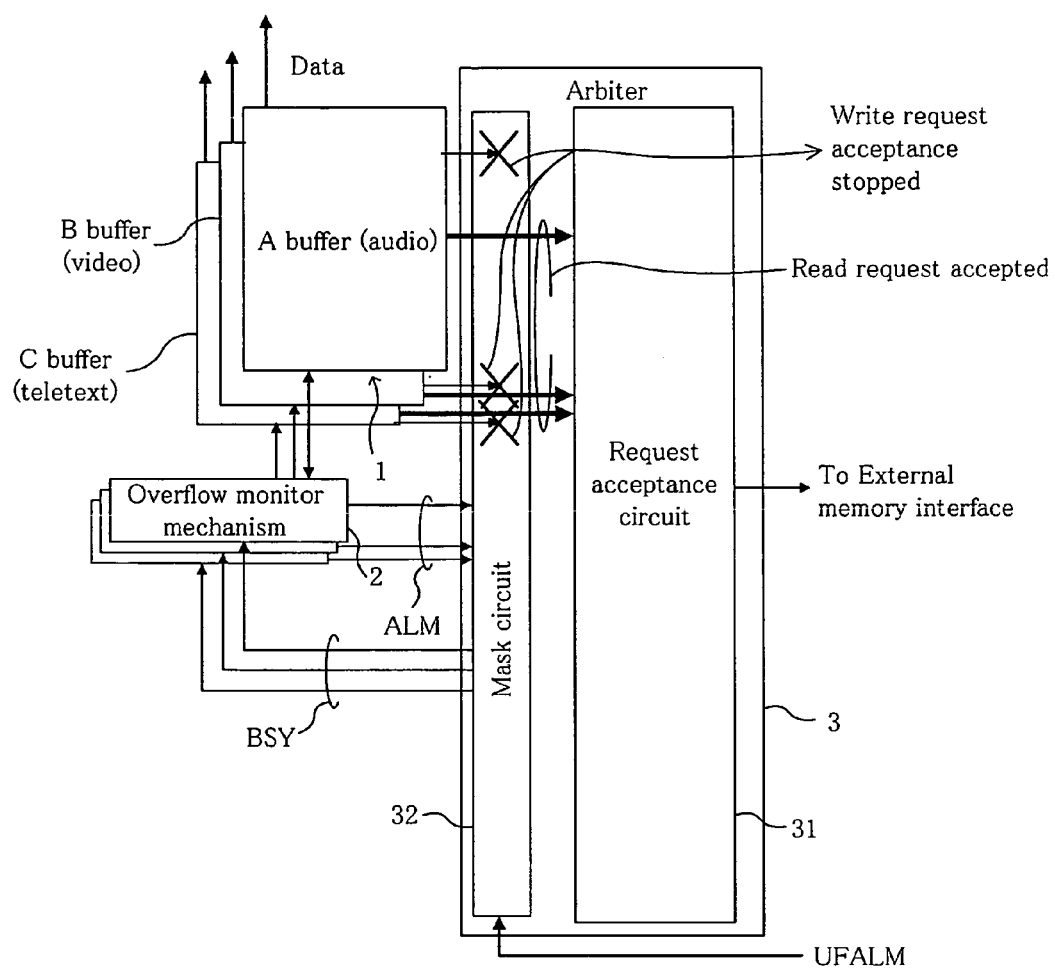
FIG. 16 is a view showing an example in which the priority order of arbitration has been changed.

For example, as exemplified in FIG. 16, once receiving the signal UFALM, the arbiter 3 halts all of transfer factors of write into the external memory 100 and changes the priority order of arbitration so that priority be given to data read from the external memory 100.

As described above, in Embodiment 5, consideration is given to underflow of the destination in addition to overflow with reception data. By protecting AV data, a safe system can be provided. The other part of the processing flow is substantially the same as those in Embodiments 1 to 4.

Embodiment 6

Figure 17:
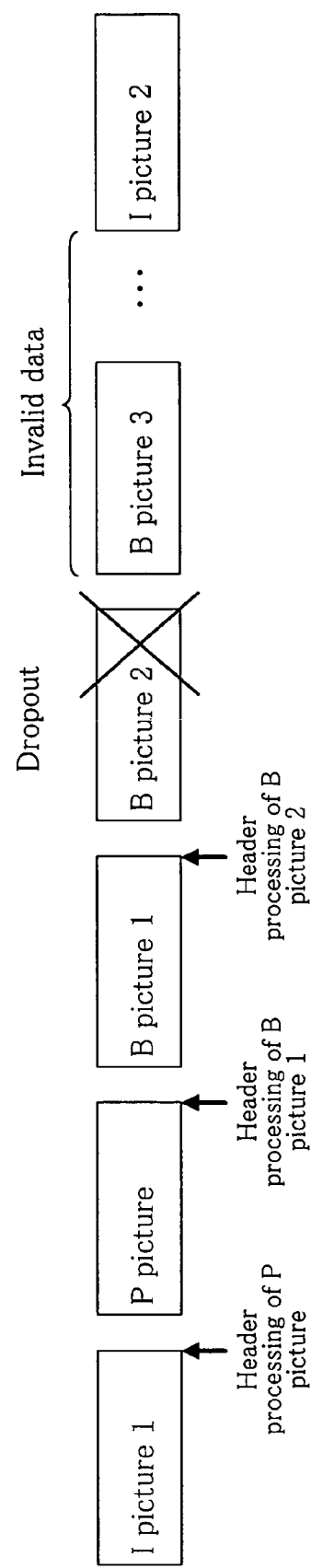
FIG. 17 is a view showing an example of a dropout of data in an MPEG2 system.

In Embodiment 5, AV data is protected to prevent occurrence of irregularities in images and thus performance of the system is guaranteed. However, sufficient measures are not necessarily taken against needless transfer occurring when data drops out. For example, AV data received by a digital TV includes I pictures, P pictures and B pictures as MPEG2 data as shown in FIG. 17. Header processing for B picture 2 following B picture 1 is normally performed prior to termination of processing of the B picture 1. If the B picture 2 drops out due to a disturbance or the like and B picture 3 comes next, no processing as an image is available and thus data received until arrival of I picture 2 next to I picture 1 is useless.

In view of the above, in Embodiment 6, provided is a mechanism in which the AV decoder sends a signal indicating a dropout of data to the transport decoder, so that the transport decoder refrains from acquiring AV data or discards AV data if having acquired until data necessary for the AV decoder comes, according to the kind of the dropout of data.

For example, in the example shown in FIG. 17, in which B picture 2 has dropped out, B picture 1 is continuously output until I picture 2 comes, while the transport decoder refrains from acquiring AV data or discards AV data if having acquired. In this way, needless transfer is avoided and thus power consumption can be reduced.

Figure 18:
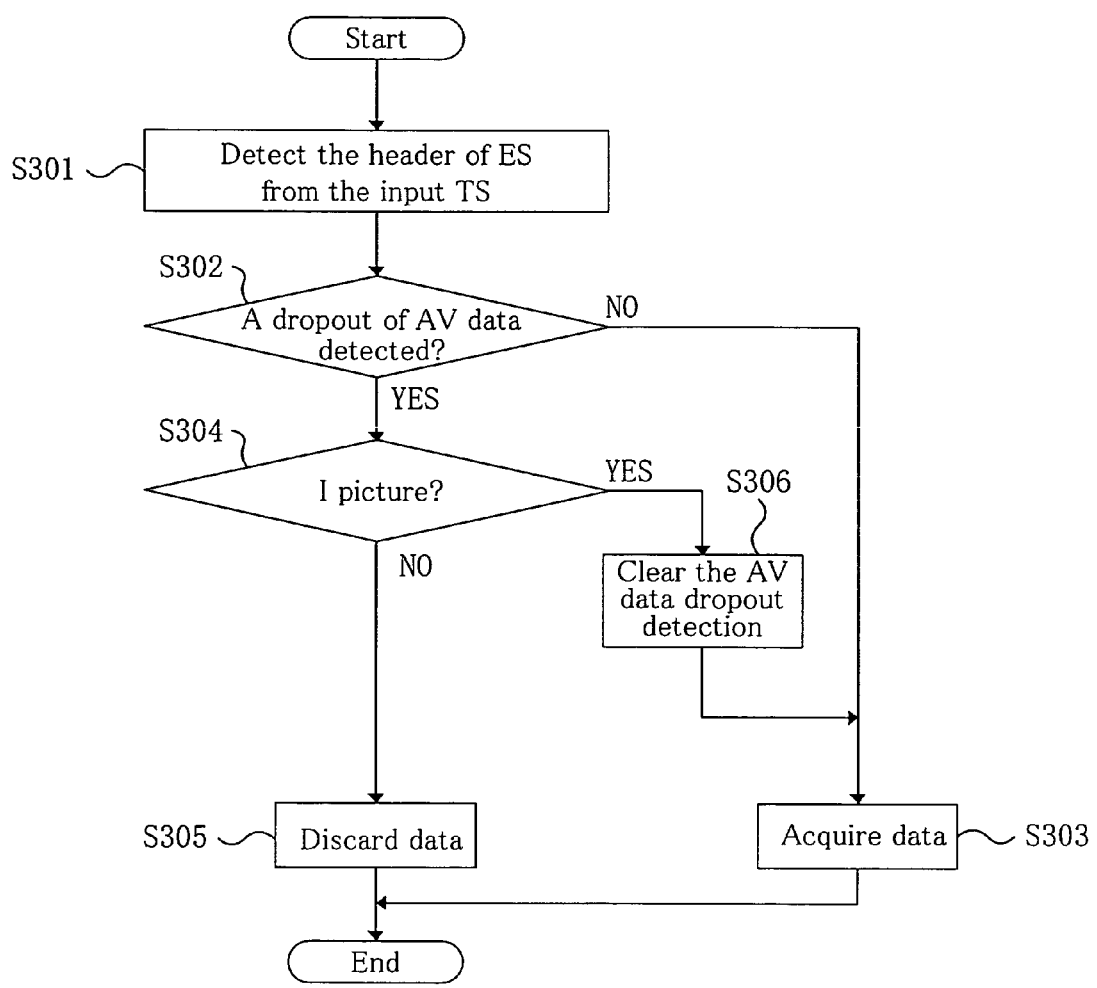
FIG. 18 is a flowchart of data selection in Embodiment 6 of the present invention.

FIG. 18 shows a flow of the control method described above. First, in step S301, the header of an elementary stream (ES) is detected from an input transport stream (TS). In step S302, whether or not there is a dropout in reception AV data is detected from the detected header. If no data dropout is detected, the reception AV data is acquired in step S303. If a data dropout is detected, the element of AV data of which reception is unnecessary is determined in step S304. Specifically, whether or not the received data is I picture is determined. If it is determined that the reception AV data is the unnecessary element, that is, it is not an I picture in step S304, the data determined as unnecessary is discarded in step S305. If it is determined that the reception AV data is not the unnecessary element, that is, it is an I picture in step S304, the data dropout detection is cleared in step S306, and the process proceeds to the step S303 for data acquisition. The above flow is then repeated from the step S301.

Figure 19:
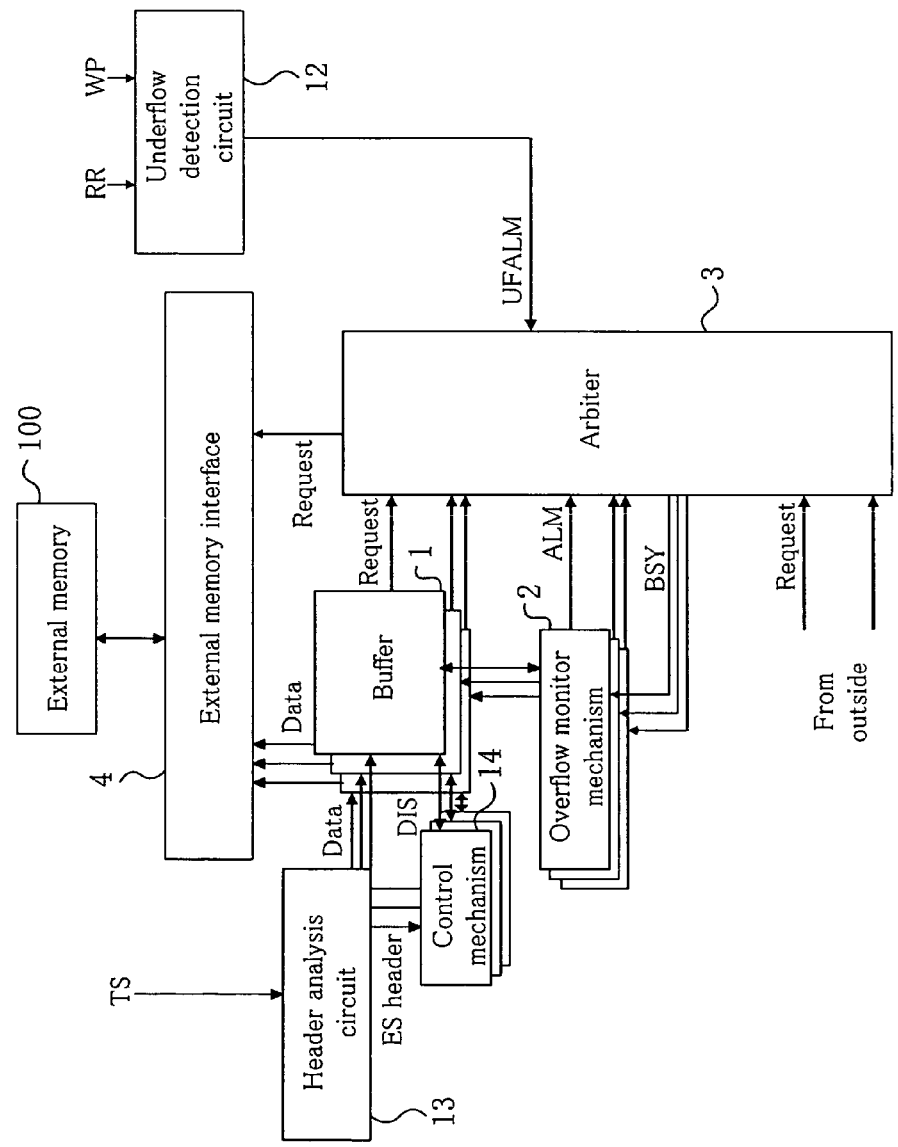
FIG. 19 is a block diagram of an arbitration device of Embodiment 6 of the present invention.

FIG. 19 shows a configuration of an arbitration device of one embodiment of the present invention. As shown in FIG. 19, the arbitration device of Embodiment 6 includes a header analysis circuit 13 for analyzing a header in the input stream and a control mechanism 14 for discarding unnecessary data, in addition to the components of the arbitration device of Embodiment 5.

The header analysis circuit 13 detects the header of an elementary stream from the transport stream TS as the input stream and outputs the detected header to the control mechanism 14. The header analysis circuit 13 also outputs data obtained by removing a predetermined header from the elementary stream to the buffer group 1.

Figure 20:
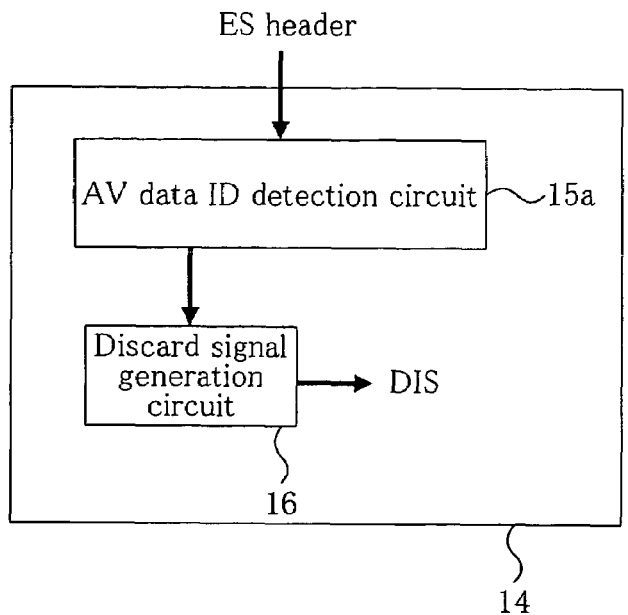
FIG. 20 is a block diagram of a control mechanism in Embodiment 6 of the present invention.

As shown in FIG. 20, the control mechanism 14 includes an AV data ID detection circuit 15a and a discard signal generation circuit 16. When reception data is determined as AV data by the header analysis circuit 13, the AV data ID detection circuit 15a analyzes the header of the AV data and accumulates the analysis result. Also, the AV data ID detection circuit 15a detects occurrence of a dropout in part of the AV data, which is determined invalid, and decides to discard the AV data until arrival of the next valid data, or specifically, until reception of the next I picture. The discard signal generation circuit 16 outputs a signal DIS indicating discard of the AV data according to the decision by the AV data ID detection circuit 15a. Once receiving the signal DIS, the buffer group 1 stops receiving data from the header analysis circuit 13, or if already having stored invalid data, discards the data.

As described above, in Embodiment 6, by eliminating needless transfer, available space is given in the bandwidth of the system, and this improves the performance of other transfer factors such as a microcomputer. The other part of the flow of data is substantially the same as those in Embodiments 1 to 5.

Embodiment 7

In Embodiment 6, AV data is protected when there is no danger of occurrence of an overflow with reception data. This can prevent occurrence of irregularities in images and thus improve the effective bandwidth. A reception stream includes data called sections in addition to an audio signal, a video signal and a character signal. When the stream currently being input consists of section data, data protected when there is a danger of an overflow of a buffer with reception data is not AV data but the section data. In other words, precedence is given to protection of the section data over AV data and this may results in insufficient protection of AV data.

Figure 21:
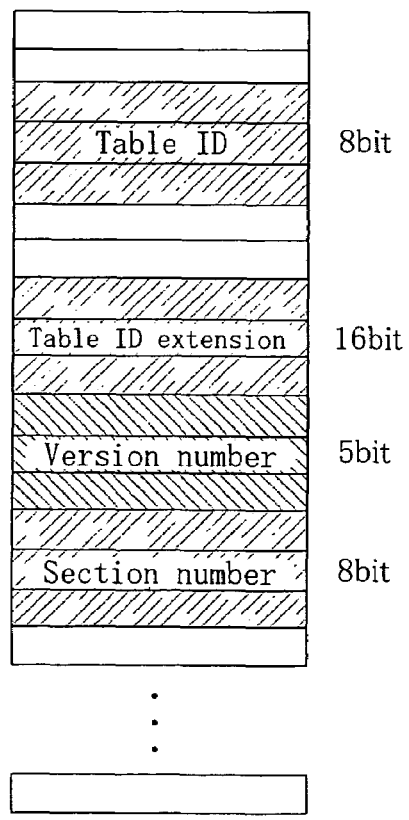
FIG. 21 is a data structural view of section data.

As shown in FIG. 21, section data includes a data string indicating ID called table ID, a data string of version number indicating the newness of the section data, and a data string of section number indicating the order of connection of divided sections if one unit of section data is divided into a plurality of sections for transmission. The section data also has ID named table ID extension for distinction from other multiplexed sections. The section data having this control structure has unique repeat period, and a section identical in table ID, version number and section number is repeatedly received according to the repeat period. Therefore, the degree of importance of section data is low compared with AV data.

From the analysis result output from the header analysis circuit 13 for analyzing headers in an input stream, the following control may be made. That is, when the reception data consists of section data, this section data as the reception data is discarded if the signal UFALM indicating a danger of occurrence of an underflow in the AV decoder is received or if the signal ALM indicating a danger of occurrence of an overflow in the buffer group related to other reception data is received. By this control, some space becomes available in the bandwidth of the system, and this can improve performance of other transfer factors such as a microcomputer.

Figure 22:
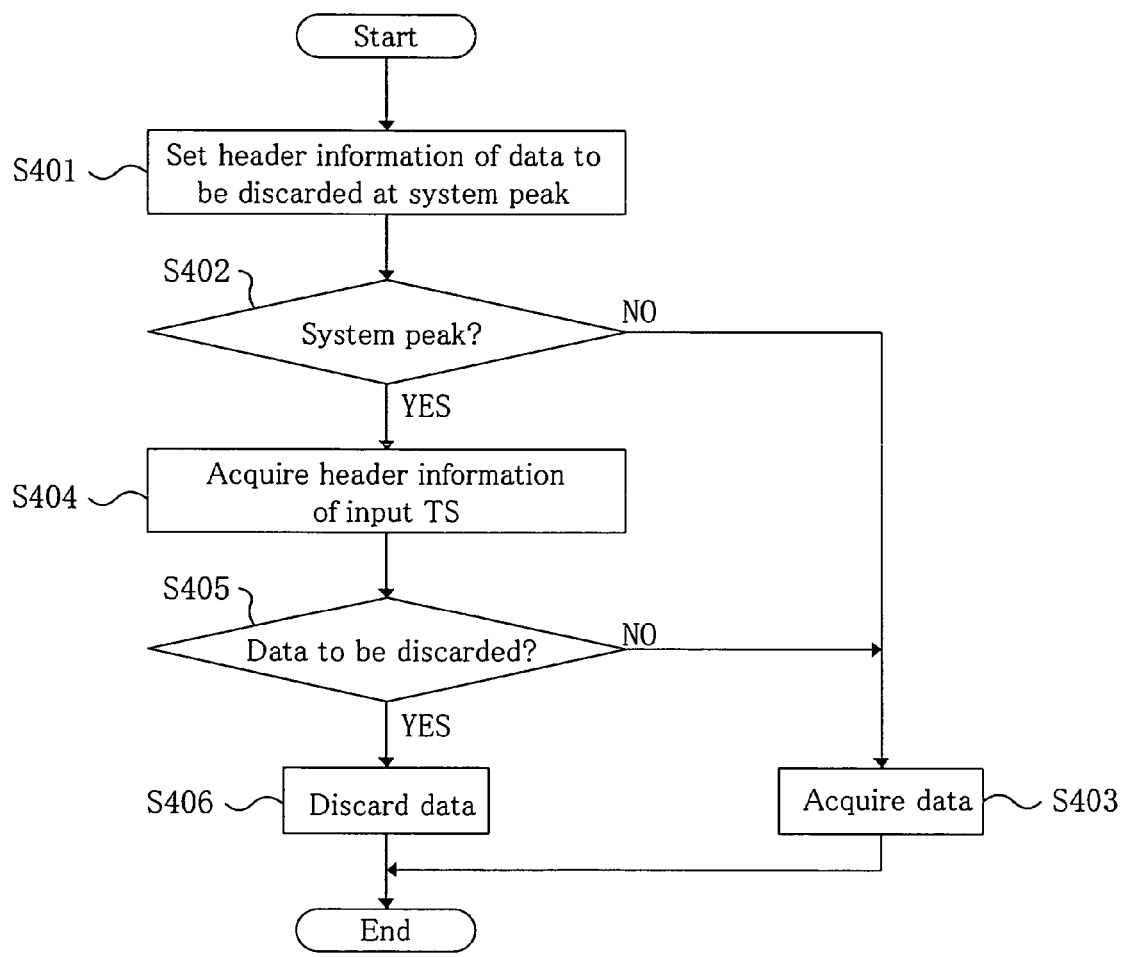
FIG. 22 is a flowchart of data selection in Embodiment 7 of the present invention.

FIG. 22 shows a flow of the control method described above. First, in step S401, as for data that should essentially be acquired but has been decided to discard if the system state is in its peak, header information used for determination of this data is set. For example, in the case of giving precedence to protection of AV data over section data, header information of section data is set. In step S402, the system state is detected to determine whether or not the system is in a danger state in performance, that is, the system state is in its peak. If it is determined in the step S402 that the detection result indicates no danger, the received data is acquired in step S403. An example of the system state being in its peak is the case that the signal ALM is output from the overflow monitor mechanism 2.

If it is determined in the step S402 that the detection result indicates a danger, header information in the input transport stream is acquired in step S404, and whether or not the received data is data to be discarded is determined in step S405. If the determination result in the step S405 is YES, the received data is discarded in step S406. If the determination result in the step S405 is NO, the process branches to the step S403 to acquire the data. The above flow is repeated from the step S402.

Figure 23:
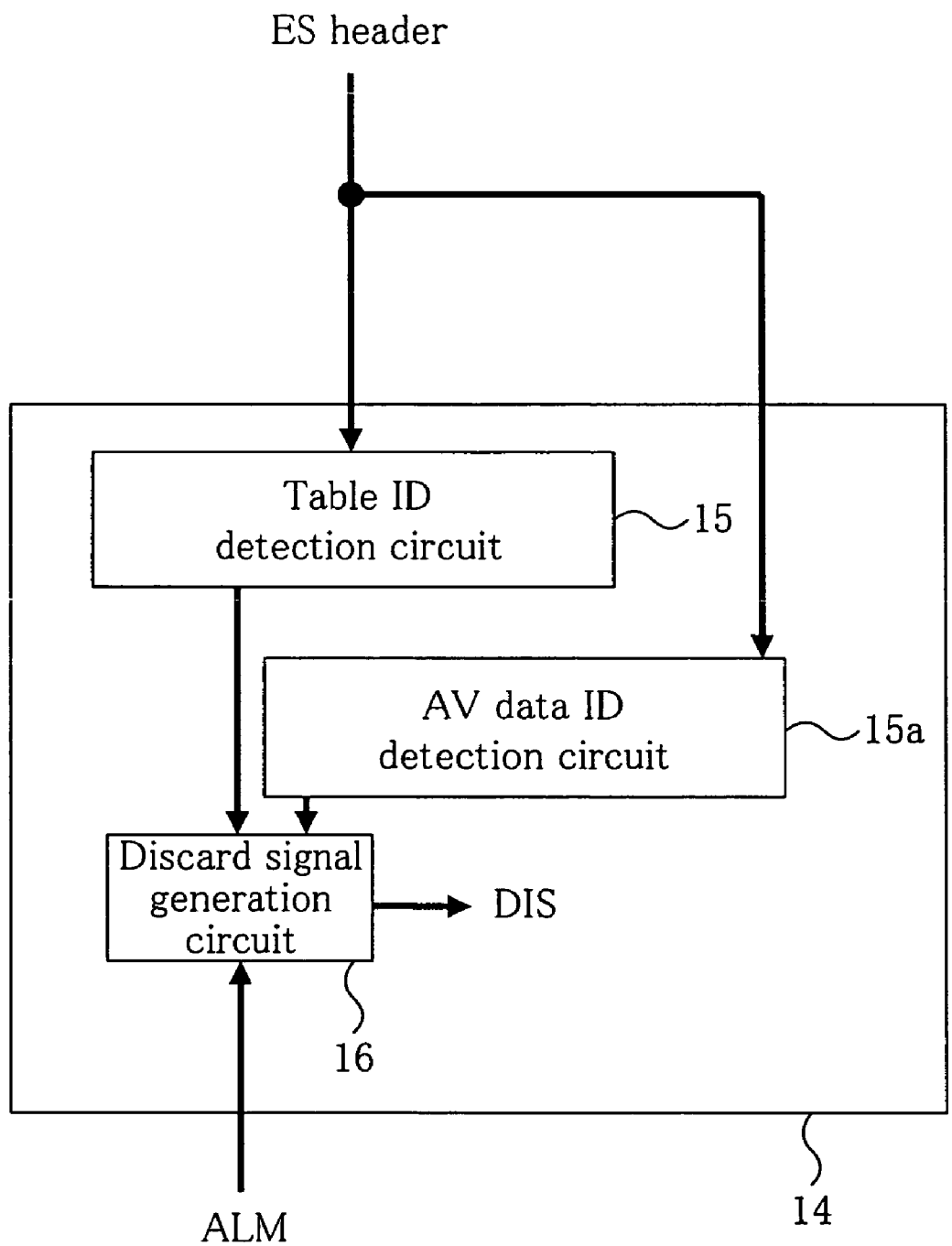
FIG. 23 is a block diagram of a control mechanism in Embodiment 7 of the present invention.

FIG. 23 shows a configuration of the control mechanism 14 in one embodiment. The section data varies with the kind of broadcast, and includes private sections standardized for each broadcast and sections having common standards under MPEG. For example, section data called PAT of the latter type can be easily identified from the table ID. The contents of PAT change only before and after a program change, and the repeat period is 100 ms. When protection of AV data becomes necessary, the time period that matters is several µs. In view of this, in Embodiment 7, as shown in FIG. 23, the control mechanism 14 includes a table ID detection circuit 15 in addition to the components shown in FIG. 20.

The table ID detection circuit 15 determines that reception data is section data from the table ID included in the header of the input elementary stream. The discard signal generation circuit 16 outputs the signal DIS indicating discard of the reception data when receiving the signal ALM indicating a danger of occurrence of an overflow of a buffer and also determined that the reception data is section data by the table ID detection circuit 15.

As described above, in Embodiment 7, since some space becomes available in the bandwidth, allowing allocation to a microcomputer and the like, performance of the system can be improved. Also, by eliminating needless transfer, power consumption can be reduced. The other part of the flow of data is substantially the same as those in Embodiments 1 to 6.

Embodiment 8

Figure 24:
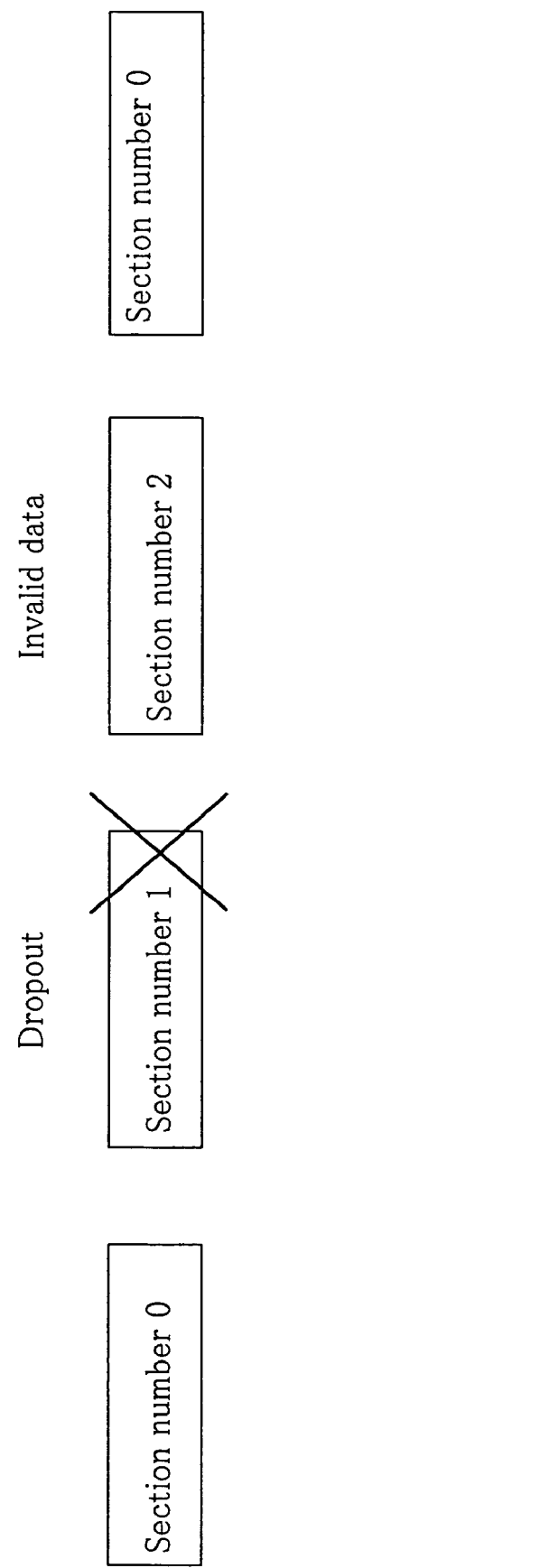
FIG. 24 is a view showing an example of a dropout of section data in a digital TV system.

When section data to be received is divided into a plurality of sections, it is effective to detect a data string of section number indicating the order of connection possessed by each of the divided sections. However, when section data of section number "2" is received after reception of section data of section number "0" without reception of section data of section number "1", as shown in FIG. 24, for example, the section data "2" will not be valid data. It is therefore necessary to avoid needless transfer by discarding unnecessary data, that is, the section data "2" in the illustrated case.

Figure 25:
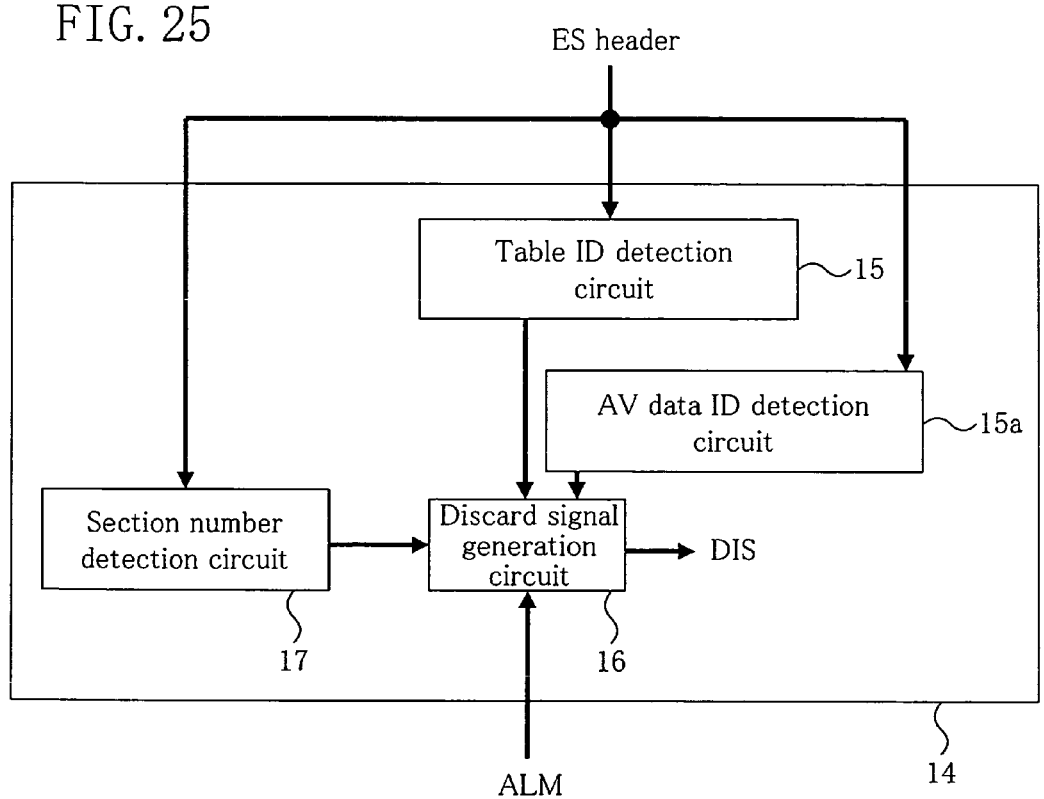
FIG. 25 is a block diagram of a control mechanism in Embodiment 8 of the present invention.

FIG. 25 shows a configuration of the control mechanism 14 in one embodiment. As shown in FIG. 25, in the arbitration device of Embodiment 8, the control mechanism 14 includes a section number detection circuit 17 for detecting the section number to determine the continuity thereof to thereby determine validity of the reception data, in addition to the components of the control mechanism 14 in Embodiment 7. Specifically, once determining that the section number is discontinuous, the section number detection circuit 17 decides that the reception data is invalid data. The discard signal generation circuit 16 outputs the signal DIS indicating discard of the reception data when receiving the notification that the reception data is invalid data from the section number detection circuit 17.

With the above configuration, in the event that section data of section number "1" is missing due to a disturbance or the like and is not received, as shown in FIG. 24, any section data having the same table ID is not acquired until the missing data is newly received according to the repeat period, and in this way, needless transfer can be avoided.

The other part of the LSI data flow is substantially the same as those in Embodiments 1 to 7.

As described above, in Embodiment 8, by eliminating unnecessary transfer that may occur when the section number is discontinuous, performance of the system can be improved, and power consumption can be reduced. The other part of the flow of data is substantially the same as those in Embodiments 1 to 7.

Embodiment 9

In Embodiment 8, a section changes in conformity with a rule that the version number is updated with change of the contents. In section data divided into a plurality of sections, connection of sections having different version numbers will not give valid data.

In view of this, the following control is performed. That is, if the version number is updated during reception of a plurality of divided sections and an old section remains in the internal buffer group 1 at that time, the internal buffer group 1 is cleared to discard the old section.

Figure 26:
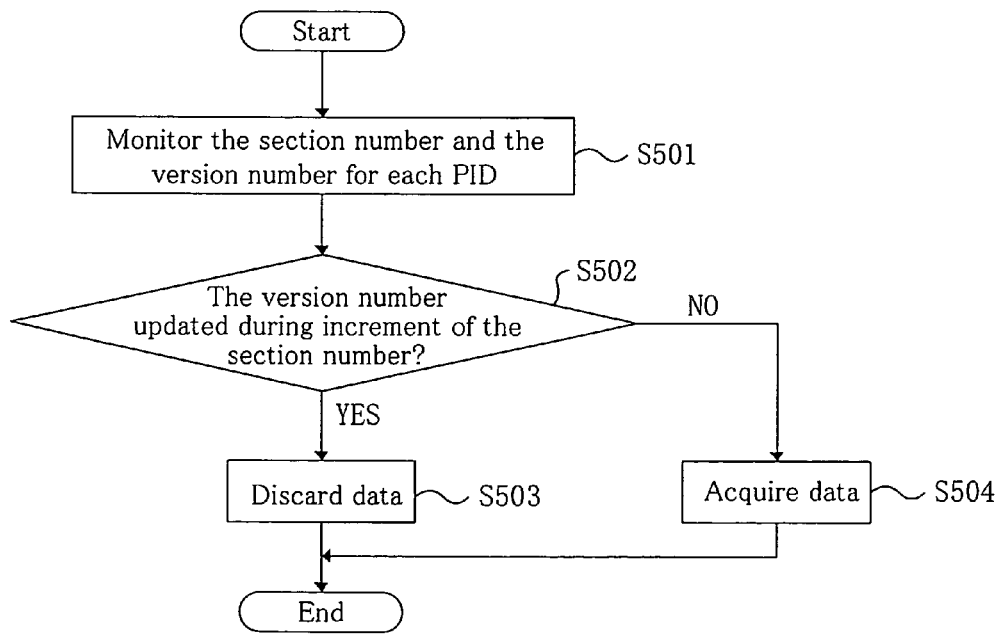
FIG. 26 is a flowchart of data selection in Embodiment 9 of the present invention.

FIG. 26 shows a flow of the control method described above. First, in step S501, the section number and the version number are monitored for each PID of section data to be received. In step S502, detected is whether or not the version number has been updated during reception of a plurality of divided sections that have the same PID and have section numbers serially incrementing with sequential reception. If updating of the version number is detected in the step S502, the process branches to step S503, in which data is discarded. If no updating of the version number is detected in the step S502, the process branches to step S504, in which data is acquired. The above flow is repeated from the step S501.

Figure 27:
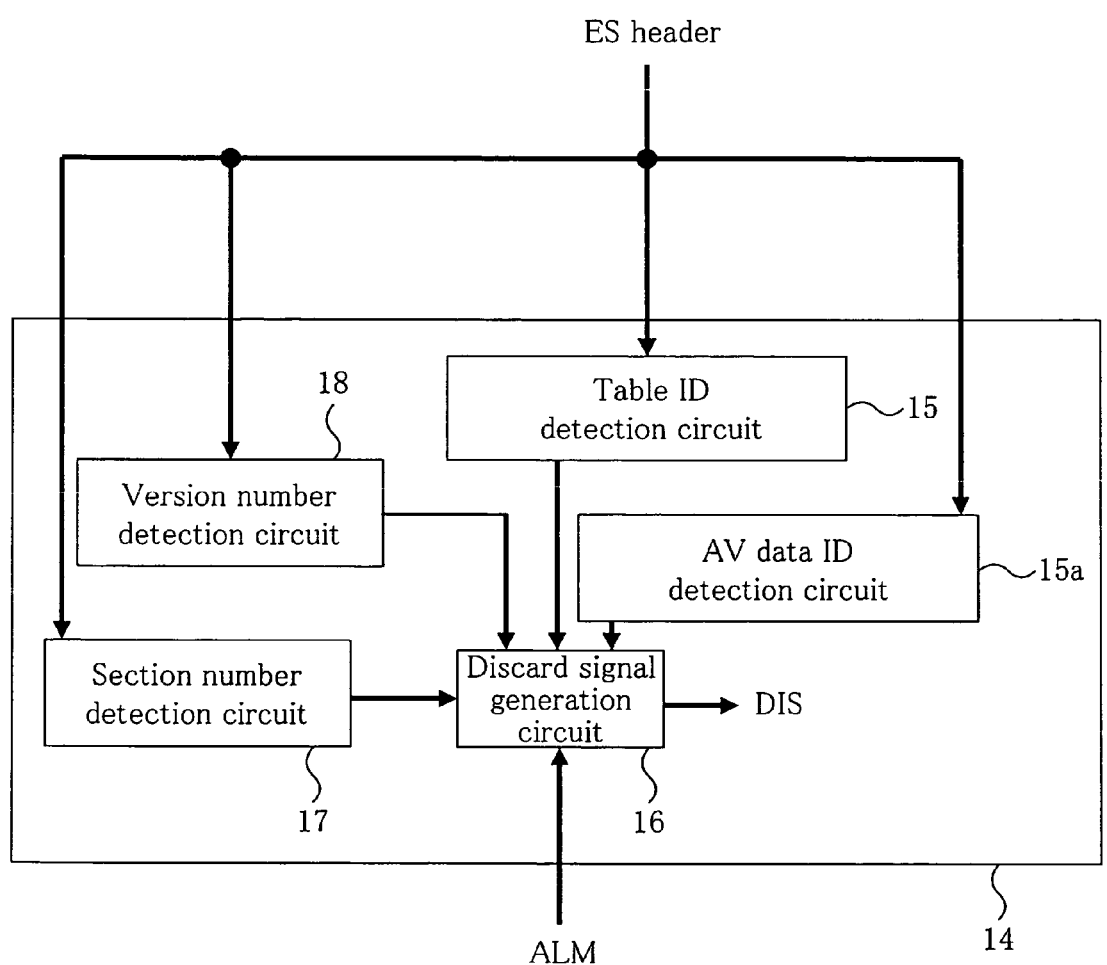
FIG. 27 is a block diagram of a control mechanism in Embodiment 9 of the present invention.

FIG. 27 shows a configuration of the control mechanism 14 in Embodiment 9. In Embodiment 9, the control mechanism 14 includes a version number detection circuit 18 for monitoring the version number of sections, in addition to the components shown in FIG. 25. The discard signal generation circuit 16 outputs the signal DIS indicating discard of the reception data once receiving the notification that the version number has been updated.

As described above, in Embodiment 9, needless transfer that may otherwise occur when the version number is updated can be eliminated. The other part of the LSI data flow is substantially the same as those in Embodiments 1 to 8. The elimination of needless transfer will lead to reduction in power consumption. The other part of the flow of data is substantially the same as those in Embodiments 1 to 8.

Embodiment 10

The header analysis and the like performed in Embodiments 1 to 9 can also be implemented by software. Free change of setting by software will lead to reduction in the number of circuits and improvement in the degree of freedom of setting.

Figure 28:
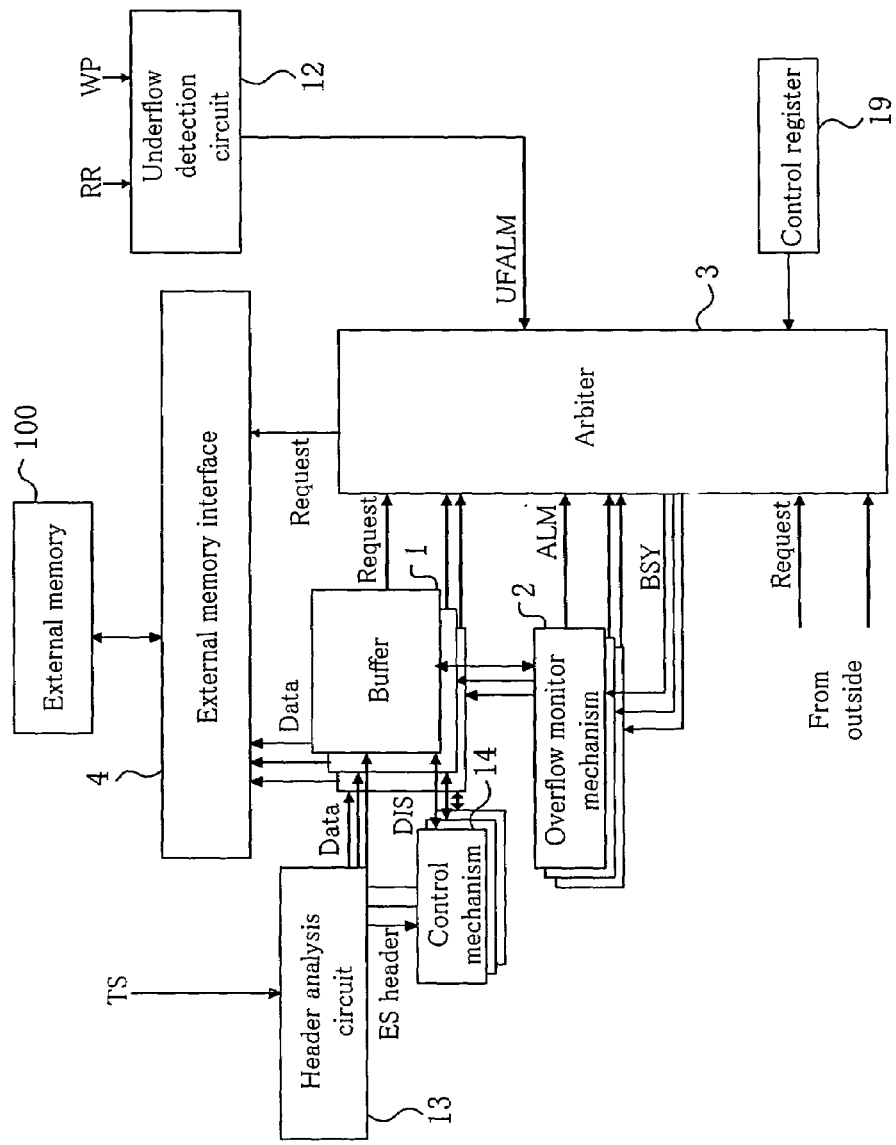
FIG. 28 is a block diagram of an arbitration device of Embodiment 10 of the present invention.

In Embodiment 10, as shown in FIG. 28, provided is a control register 19 that permits register setting from outside to change the priority of arbitration by the arbiter 3. With this configuration, the arbitration for memory access by the transport decoder can be freely changed via software, to attain substantially the same effects as those in Embodiments 1 to 9. The other part of the LSI data flow is substantially the same as those in Embodiments 1 to 9.

Embodiment 11

In Embodiments 1 to 10, although AV data can be protected, protection of teletext is less than sufficient.

As for teletext temporarily stored in the external memory and then read from a temporary-storing memory such as the external memory in response to a request from the AV decoder, the time period during which the teletext be sent is definitely decided according to the digital TV specifications. This time period can be determined from a horizontal sync signal and a vertical sync signal as sync signals for outputting TV images to a monitor. If teletext data fails to be sent to the AV decoder during this time period, abnormality occurs in character data output onto the screen.

Figure 29:
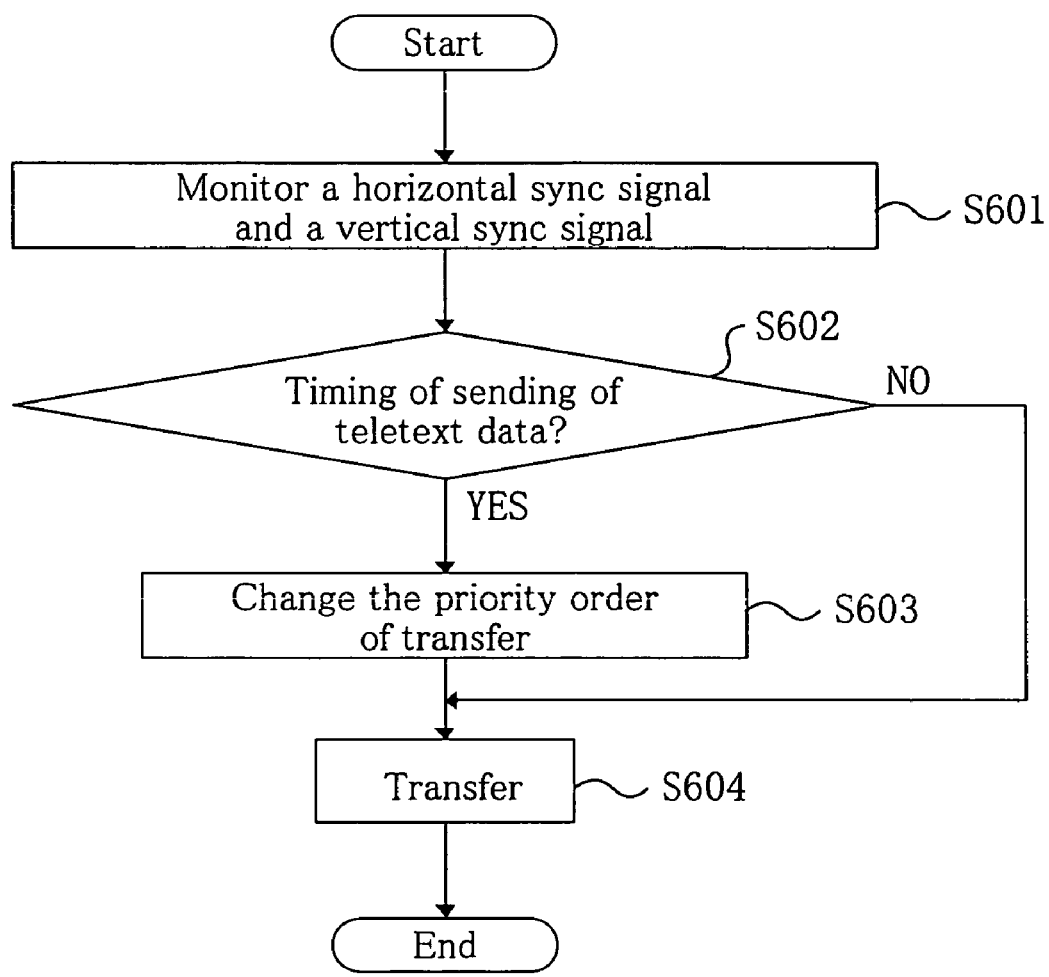
FIG. 29 is a flowchart of an arbitration method of Embodiment 11 of the present invention.

In view of the above, in Embodiment 11, transfer of teletext data is guaranteed by changing the priority order of data transfer, to secure efficient transfer. FIG. 29 shows a flow of the control method described above. First, in step S601, the horizontal sync signal and the vertical sync signal are monitored. In step S602, whether or not it is the timing of sending of teletext data is determined based on the horizontal sync signal and the vertical sync signal. If the determination result in the step S602 is YES, the priority order of transfer is changed in step S603, and data transfer is performed in step S604. If the determination result in the step S602 is NO, the process proceeds to the step S604 with the normal priority order being kept unchanged. Once the data transfer is completed, the above processing is repeated from the step S601.

Figure 30:
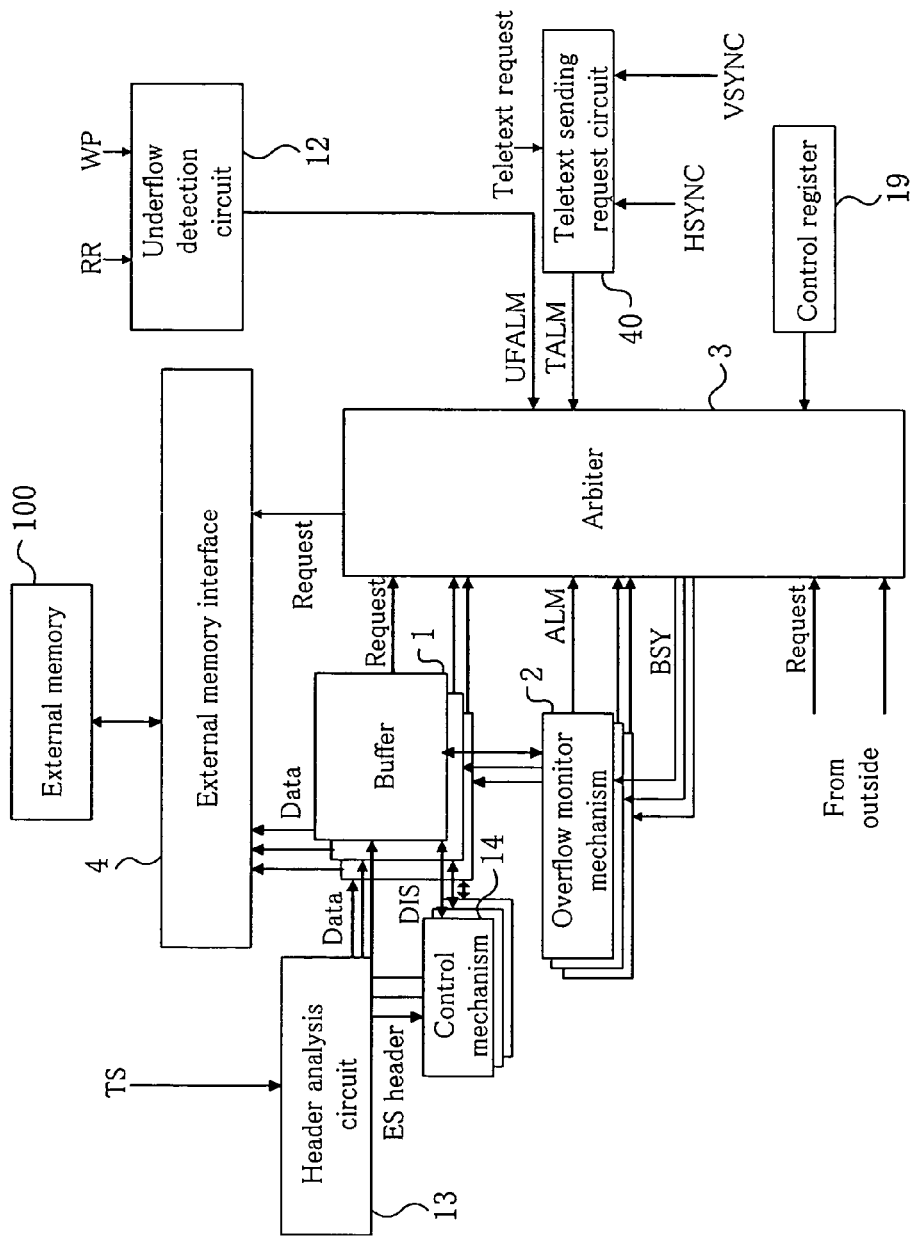
FIG. 30 is a block diagram of an arbitration device of Embodiment 11 of the present invention.

FIG. 30 shows a configuration of an arbitration device of one embodiment. The arbitration device of Embodiment 11 includes a teletext sending request circuit 40 in addition to the components of the arbitration device of Embodiment 10. The teletext sending request circuit 40 determines the time period during which teletext data should be sent based on the horizontal sync signal and the vertical sync signal, and outputs a signal TALM for requesting transfer of teletext data immediately before the time at which teletext can be sent within the time period after issuance of a request for teletext. Once receiving the signal TALM, the arbiter 3 changes the priority order of arbitration to give the highest priority to transfer of teletext data.

As described above, in Embodiment 11, read of teletext is considered, and substantially the same effects as those in Embodiments 1 to 10 can be obtained. The other part of the LSI data flow is substantially the same as those in Embodiments 1 to 10.

Embodiment 12

Figure 31:
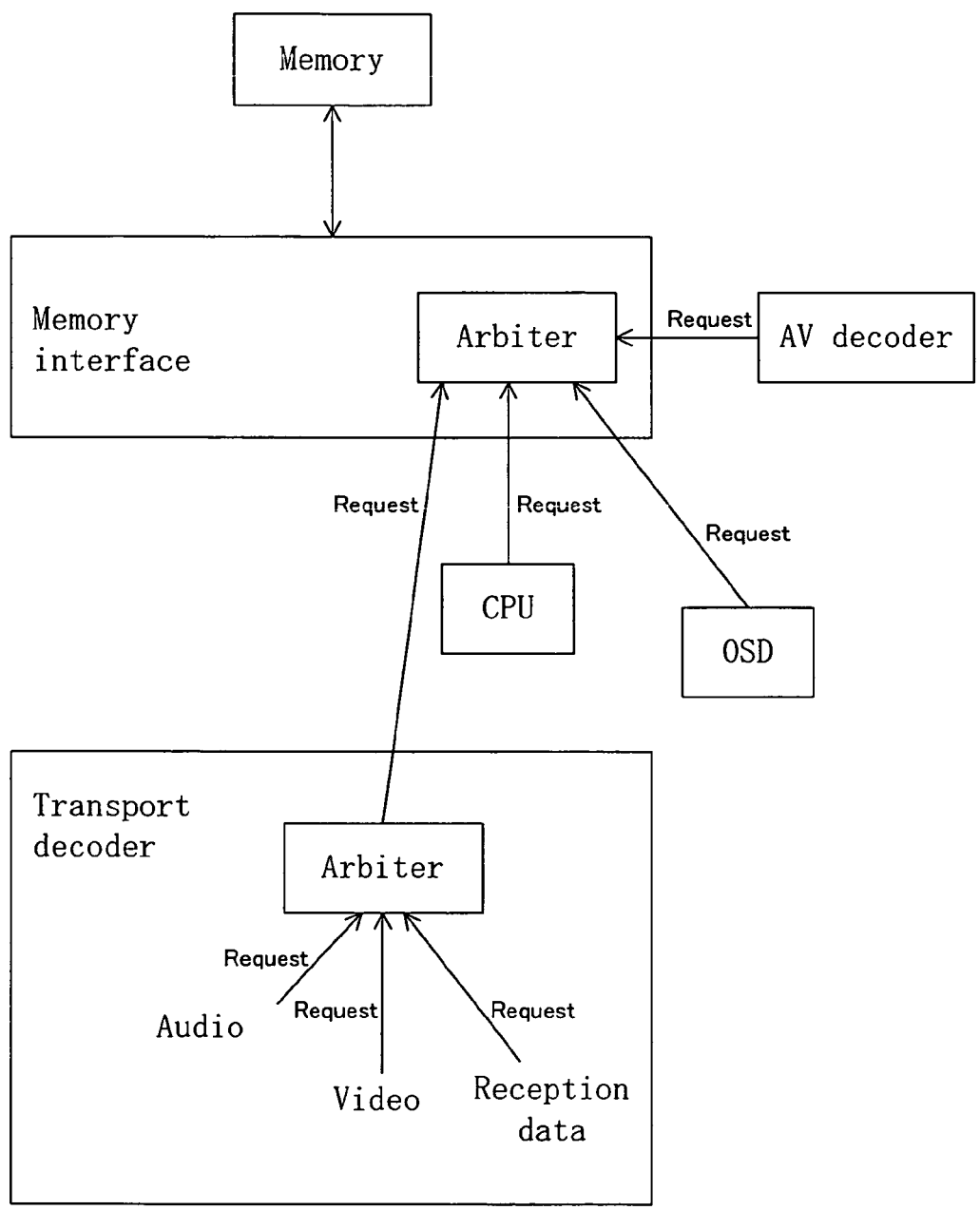
FIG. 31 is a block diagram of a digital TV system.

In Embodiments 1 to 11, AV data can be protected and the effective bandwidth can be improved. However, as shown in FIG. 31, a DTV system includes a transport decoder, an AV decoder and their peripheral circuits, and may adopt a two-stage structure in which an external memory is shared by the transport decoder and other cores simultaneously and each core is provided with an arbiter (for example, unified memory architecture). In this case, the arbiter of the memory interface may not give priority to processing of a transfer request to which higher priority order has been given in the transport decoder.

Figure 32:
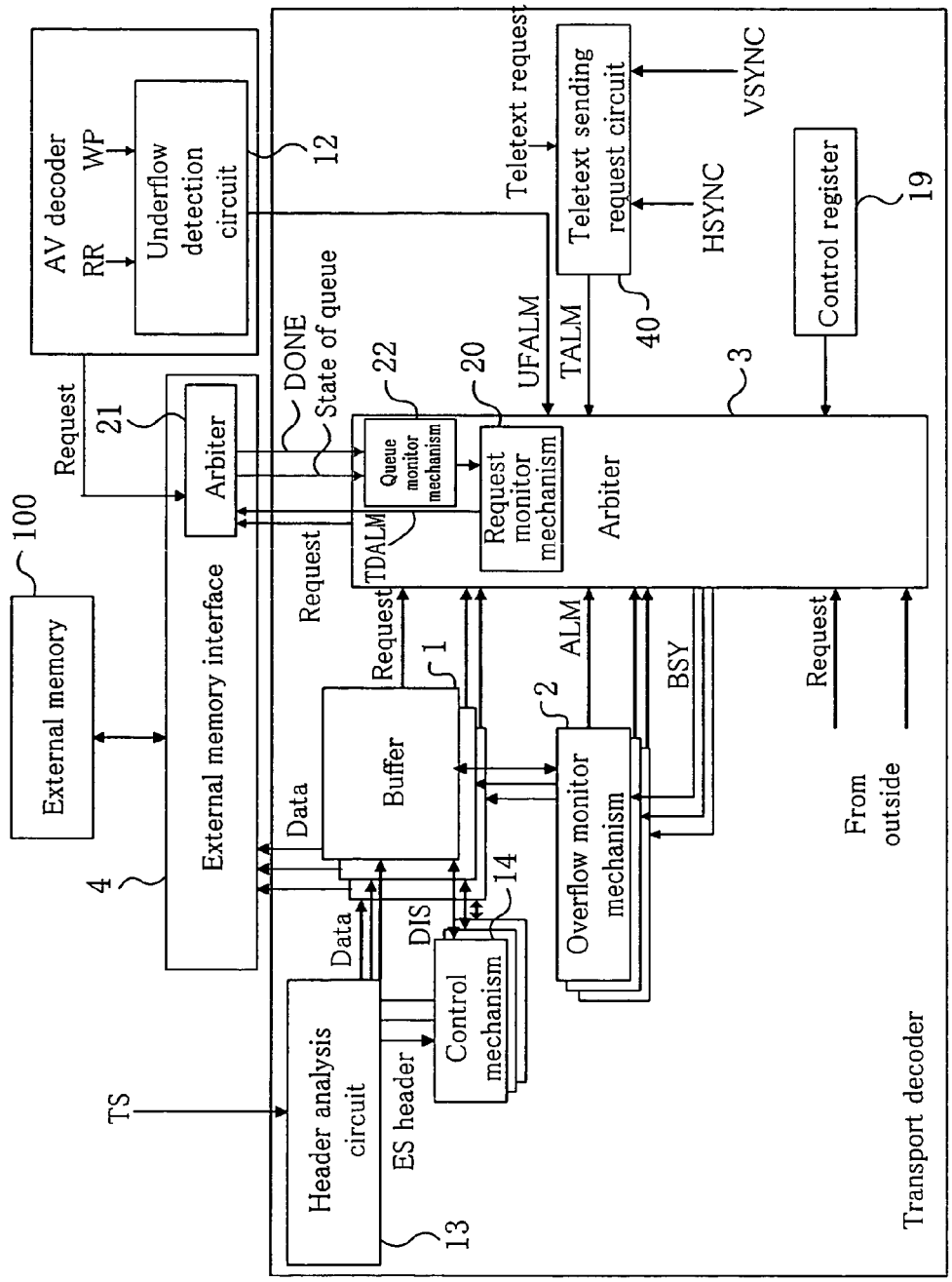
FIG. 32 is a block diagram of an arbitration device of Embodiment 12 of the present invention.

In view of the above, in Embodiment 12, as shown in FIG. 32, the arbitration device of Embodiment 11 is provided inside the transport decoder, the arbiter 3 includes a request monitor mechanism 20 and a queue monitor mechanism 22, and the external memory interface 4 includes an arbiter 21.

The request monitor mechanism 20 sends a signal TDALM as an emergency request to the arbiter 21 of the external memory interface 4 once receiving the signal ALM from the overflow monitor mechanism 2 and the signal UFALM from the underflow detection circuit 12 of the AV decoder.

The arbiter 21 of the external memory interface 4 receives requests from cores. In particular, once receiving the signal TDALM from the transport decoder, the arbiter 21 changes the priority order of arbitration so that priority is given to a request from the transport decoder.

The queue monitor mechanism 22 monitors a signal DONE indicating that the external memory interface 4 has accepted a request from a core and also monitors the state of a queue in the external memory interface 4, and outputs a signal indicating the state of free space of the queue. The queue monitor mechanism 22 monitors, not only the queue for the transport decoder, but also queues related to other cores. When the request monitor mechanism 20 receives a notification that a queue for a core in the external memory interface 4 has free space from the queue monitor mechanism 22, it issues a request to the external memory interface 4. Thus, the transport decoder is granted bus use right when a queue for a core has free space, to enable access to the external memory 100.

As described above, in Embodiment 12, a system having a plurality of cores can also obtain substantially the same effects as those in Embodiments 1 to 11. The other part of the LSI data flow is substantially the same as those in Embodiments 1 to 11.

Embodiment 13

The request acceptance time and the like measured in Embodiments 1 to 12 can be output as a log every fixed time and stored.

Figure 33:
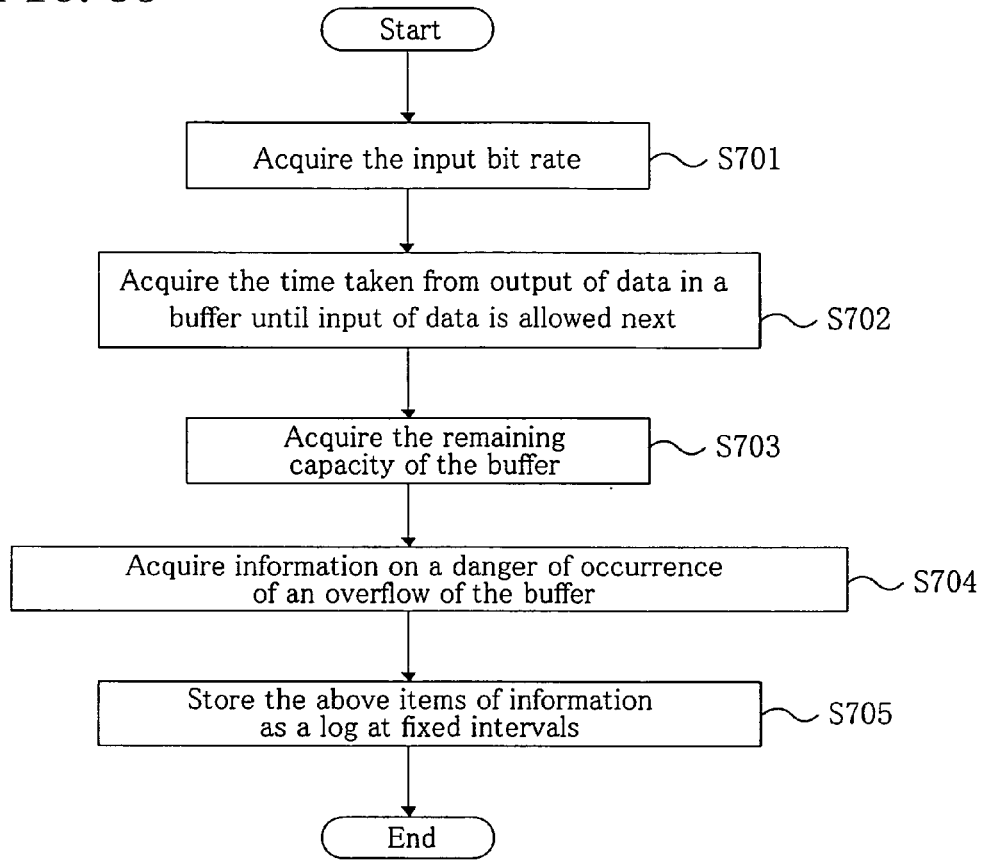
FIG. 33 is a flowchart of log generation in Embodiment 13 of the present invention.

FIG. 33 shows a log storing method. First, in step S701, the input bit rate of data input into a buffer is acquired. Specifically, the input bit rate Y is acquired from the input bit rate table 7 shown in FIG. 11 and the like. In step S702, the time taken from output of data in a buffer until input of data is allowed next is acquired. Specifically, the maximum processing time Z is acquired from the output time setting circuit 8 shown in FIG. 11 and the like. In step S703, the remaining capacity of the buffer is acquired. Specifically, the remaining capacity X is acquired from the remaining capacity monitor circuit 6 shown in FIG. 11 and the like. In step S704, information on whether or not there is a danger of occurrence of an overflow of the buffer is acquired from the relationship between the remaining capacity of the buffer and the transfer time taken for input/output. Specifically, the signal ALM is acquired from the alarm generation circuit 9 shown in FIG. 11 and the like. In step S705, the various items of information acquired in the steps S701 to S704 are stored as a log at fixed intervals. The above operation is repeated from the step S701. The order of acquisition of these items of information is not limited to this, but the information may be acquired in any order. Otherwise, these items of information may be acquired simultaneously.

Figure 34:
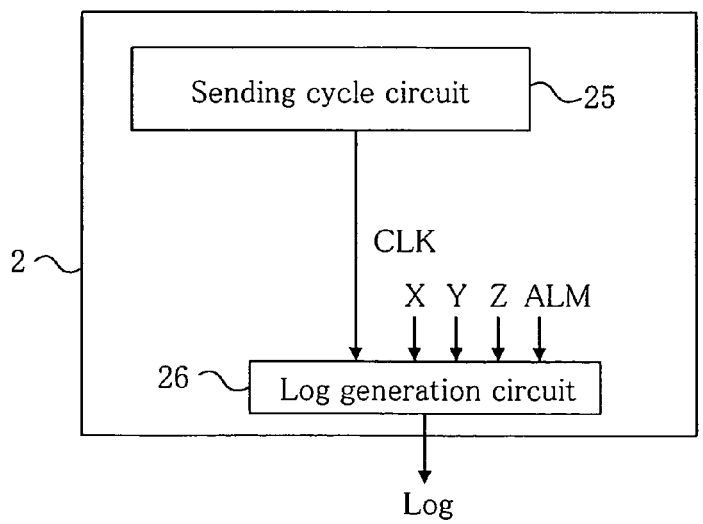
FIG. 34 is a block diagram of an overflow monitor mechanism in Embodiment 13 of the present invention.

FIG. 34 shows an example of the overflow monitor mechanism 2 for implementing the flow shown in FIG. 33 in the arbitration device of Embodiment 13. The overflow monitor mechanism 2 in this embodiment includes a sending cycle circuit 25 for determining the sending cycle of a log and a log generation circuit 26 for generating a log from various items of input information. The log generation circuit 26 generates a log from the remaining capacitance X of a buffer, the input bit rate Y, the maximum processing time Z and the signal ALM input therein, and holds the generated log. The held log is output externally in synchronization with a clock signal CLK output from the sending cycle circuit 25.

The thus-generated log is usable for analysis to be done when a problem arises in actual operation, and therefore the analysis efficiency of the arbitration device improves. The other part of the flow of data is substantially the same as those in Embodiments 1 to 12.

The arbitration method and device of the present invention can increase the effective bandwidth without increasing the operating frequency and the transfer amount allowed at one time of transfer in the interface between the LSI and an external memory. Accordingly, the present invention is applicable to digital TV systems requested to secure high quality and high reliability at low cost.

What is claimed is:

1. An arbitration method for arbitrating transfer requests for a plurality of items of transfer data, comprising:

dynamically changing the priority order of arbitration set in advance for the plurality of items of transfer data based on information indicating a danger of occurrence of an overflow with the transfer data;

monitoring a system state of a transport decoder;

acquiring header information of a transport stream received by the transport decoder when the system state is in its peak;

determining whether or not the acquired header information agrees with header information of data that has been received by the transport decoder and determined to be discarded when the system state is in its peak; and discarding the received data if the acquired header information agrees.

2. An arbitration method for arbitrating transfer requests for a plurality of items of transfer data, comprising:

dynamically changing the priority order of arbitration set in advance for the plurality of items of transfer data based on information indicating a danger of occurrence of an overflow with the transfer data;

monitoring section data and a version number and a section number related to the section data for each packet ID of a received transport stream;

detecting whether or not the version number has been updated during reception of section data divided into a plurality of sections having the same packet ID; and discarding the section data if updating of the version number is detected.

3. An arbitration method for arbitrating transfer requests for a plurality of items of transfer data, comprising:

dynamically changing the priority order of arbitration set in advance for the plurality of items of transfer data based on information indicating a danger of occurrence of an overflow with the transfer data;

acquiring a remaining capacity of each of a plurality of buffers in which the plurality of items of transfer data are temporarily stored respectively;

acquiring an input bit rate of the transfer data into the buffer;

acquiring a time taken from output of data stored in the buffer until storage of next transfer data in the buffer is allowed;

acquiring information on a danger of occurrence of an overflow of the buffer, predicted from the input bit rate and the remaining capacity of the buffer; and storing the above items of information as a log at predetermined intervals.

4. An arbitration device for arbitrating transfer requests for a plurality of items of transfer data, comprising:

a plurality of buffers for temporarily storing the plurality of items of transfer data respectively;

a monitor mechanism for monitoring the status of transfer of the plurality of items of transfer data to the plurality of buffers;

an arbiter for dynamically changing the priority order of arbitration for the plurality of items of transfer data based on an input bit rate of the transfer data to each of the buffers and a remaining capacity of the buffer monitored by the monitor mechanism;

means for detecting header information on an elementary stream from an input transport stream;

means for determining that reception data is section data from the header information; and means for giving an instruction of discarding the reception data when the reception data is section data in the case of receiving information indicating a danger of occurrence of an overflow with the transfer data, wherein each of the plurality of buffers deletes the reception data when receiving the instruction.

5. An arbitration device for arbitrating transfer requests for a plurality of items of transfer data, comprising:

a plurality of buffers for temporarily storing the plurality of items of transfer data respectively;

a monitor mechanism for monitoring the status of transfer of the plurality of items of transfer data to the plurality of buffers;

an arbiter for dynamically changing the priority order of arbitration for the plurality of items of transfer data based on an input bit rate of the transfer data to each of the buffers and a remaining capacity of the buffer monitored by the monitor mechanism;

means for detecting header information on an elementary stream from an input transport stream;

means for detecting a section number of received section data from the header information and making a notification that the section data is invalid if determining that the section number is discontinuous; and means for giving an instruction of discarding the received section data when receiving the notification, wherein each of the plurality of buffers deletes the received section data when receiving the instruction.

6. The arbitration device of claim 5, comprising means for detecting a version number of the received section data from the header information and making a notification of a change of the version number if the version number is changed during reception of section data divided into a plurality of sections having the same packet ID, wherein the means for giving an instruction of discarding the received section data gives an instruction of discarding the received section data when receiving the notification.

7. An arbitration device for arbitrating transfer requests for a plurality of items of transfer data, comprising:

a plurality of buffers for temporarily storing the plurality of items of transfer data respectively;

a monitor mechanism for monitoring the status of transfer of the plurality of items of transfer data to the plurality of buffers;

an arbiter for dynamically changing the priority order of arbitration for the plurality of items of transfer data based on an input bit rate of the transfer data to each of the buffers and a remaining capacity of the buffer monitored by the monitor mechanism;

means for generating a log from the input bit rate and the remaining capacity of the buffer; and means for determining sending timing of the generated log.

* * * * *